United States Patent
Kumar

(10) Patent No.: US 11,895,213 B2
(45) Date of Patent: Feb. 6, 2024

(54) APPLICATION SERVER ASSISTED CONTENT MANAGEMENT IN CELLULAR NETWORK

(71) Applicant: Samsung Electronics Co., Ltd., Suwon-si (KR)

(72) Inventor: Naveen Kumar, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/320,620

(22) Filed: May 19, 2023

(65) Prior Publication Data
US 2023/0379399 A1    Nov. 23, 2023

Related U.S. Application Data

(63) Continuation of application No. PCT/KR2023/006824, filed on May 19, 2023.

(30) Foreign Application Priority Data

May 20, 2022  (IN) .............................. 202241029281
Apr. 18, 2023  (IN) ............................ 2022 41029281

(51) Int. Cl.
*H04L 67/568*     (2022.01)
*H04L 67/60*      (2022.01)
*H04W 28/06*      (2009.01)

(52) U.S. Cl.
CPC ............ *H04L 67/568* (2022.05); *H04L 67/60* (2022.05); *H04W 28/065* (2013.01)

(58) Field of Classification Search
CPC .... H04W 28/065; H04W 76/25; H04L 67/60; H04L 67/568; H04L 67/51; H04L 67/565;
(Continued)

(56) References Cited

U.S. PATENT DOCUMENTS 8,095,530 B1 *  1/2012  Lloyd ................. G06F 16/9566
                                             707/736
8,099,511 B1 *  1/2012  Ganesan ............ H04N 21/2225
                                             709/231

(Continued)

OTHER PUBLICATIONS

Nawar Jawad, Mobile Edge Cloud: Intelligent deployment and services for 5G Indoor Network, In: Brunel University London, the degree of Doctor of Philosophy, 2021, sections 5.4-5.5.
(Continued)

*Primary Examiner* — Le H Luu
(74) *Attorney, Agent, or Firm* — Jefferson IP Law, LLP

(57) ABSTRACT

A method for content management in a cellular network is provided. The method includes receiving, by an application server, a content request including a file identity from a User Equipment (UE), performing, upon receiving the content request, by the application server, at least one action associated with content caching, content retrieval, and content deletion, assigning, by the application server, one or more assisting parameters in a header of an Internet Protocol (IP) packet, based on the at least one performed action, and assisting, by the application server, at least one of a User Plane Function (UPF) device, and a Packet Data Convergence Protocol (PDCP) device of the cellular network to manage content, based on the one or more assigned assisting parameters.

20 Claims, 18 Drawing Sheets

(58) Field of Classification Search
CPC ..... H04L 47/15; H04L 65/612; G06F 16/955; G06F 16/9566; G06F 21/10; H04N 21/2225; H04N 21/44204; H04N 21/6543
See application file for complete search history.

(56) References Cited

U.S. PATENT DOCUMENTS

| | | | |
|---|---|---|---|
| 8,769,614 B1* | 7/2014 | Knox | H04L 65/612 726/3 |
| 9,001,840 B2 | 4/2015 | Kovvali et al. | |
| 9,307,450 B2 | 4/2016 | Skog et al. | |
| 2006/0253882 A1* | 11/2006 | Chen | H04L 67/51 725/86 |
| 2010/0211776 A1* | 8/2010 | Gunaseelan | G06F 21/10 713/165 |
| 2013/0132544 A1 | 5/2013 | Krishnan et al. | |
| 2013/0144834 A1* | 6/2013 | Lloyd | G06F 16/955 707/E17.001 |
| 2016/0072911 A1 | 3/2016 | Velummylum et al. | |
| 2016/0174288 A1* | 6/2016 | Backholm | H04W 76/25 370/338 |
| 2018/0091849 A1* | 3/2018 | Ganesan | H04N 21/6543 |
| 2020/0314016 A1* | 10/2020 | Dutta | H04L 47/15 |
| 2020/0404538 A1 | 12/2020 | Zhu et al. | |
| 2021/0084110 A1* | 3/2021 | Knox | H04L 67/565 |
| 2021/0097021 A1 | 4/2021 | Kadlabalu et al. | |
| 2022/0078496 A1* | 3/2022 | Gordon | H04N 21/44204 |
| 2022/0150699 A1 | 5/2022 | Lee et al. | |

OTHER PUBLICATIONS

International Search Report dated Aug. 24, 2023, issued in International Application No. PCT/KR2023/006824.

* cited by examiner

FIG. 3
- Prior Art -
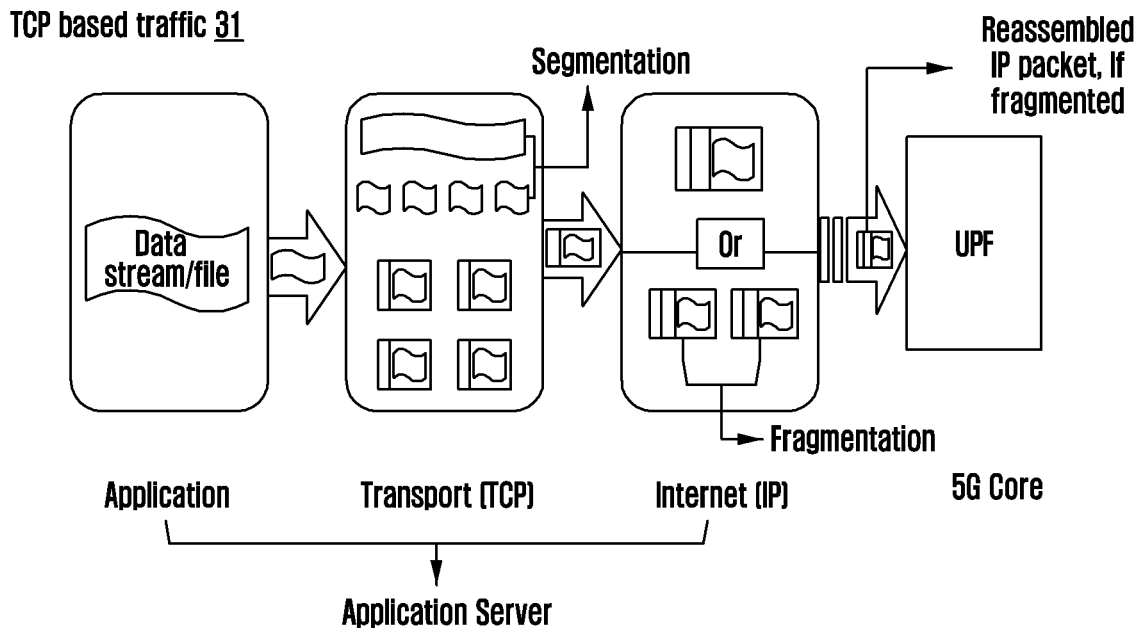
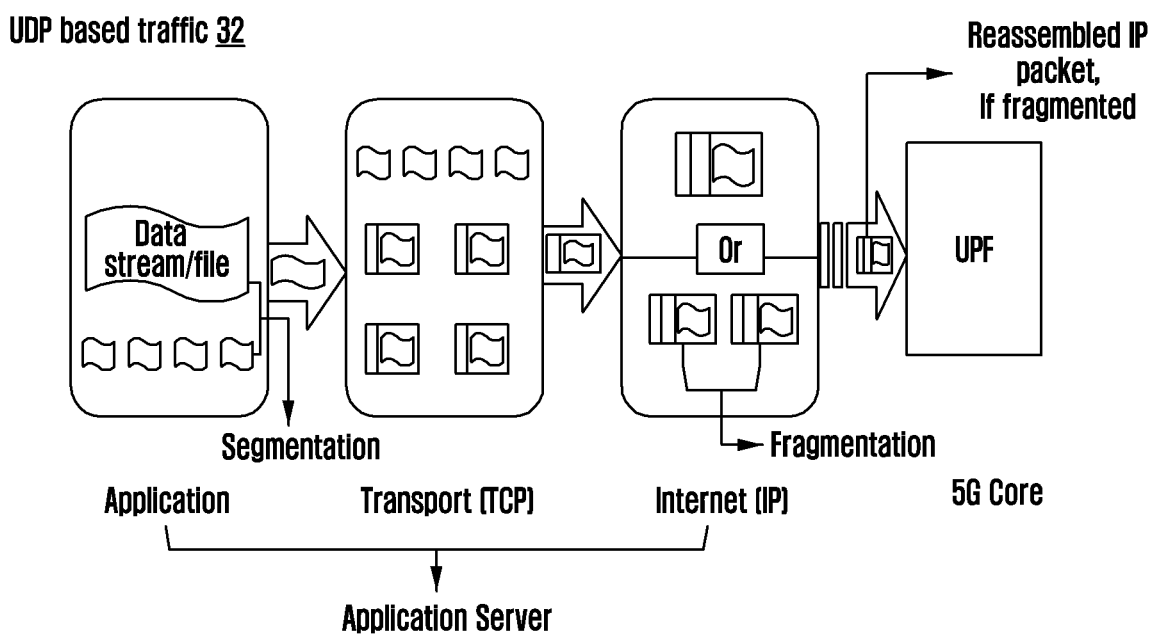

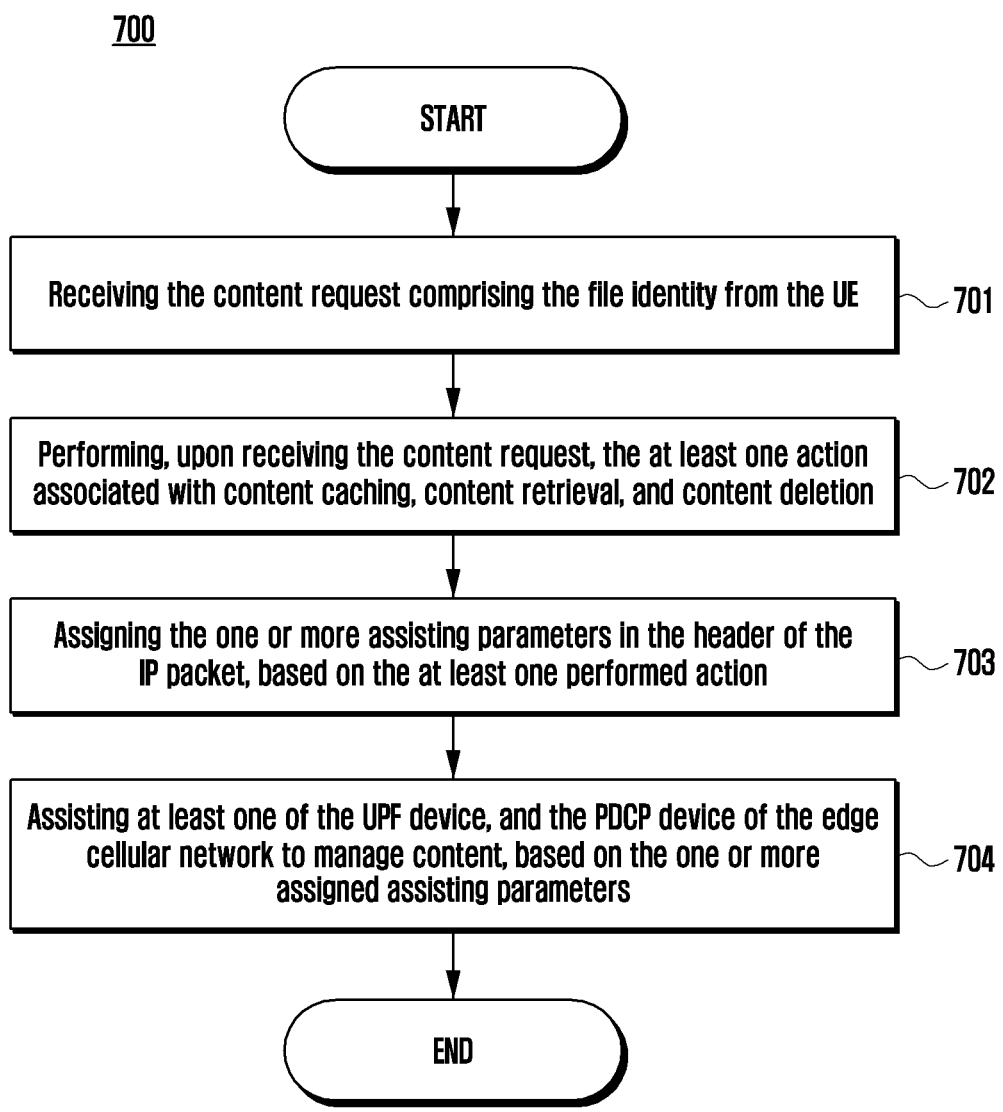

APPLICATION SERVER ASSISTED CONTENT MANAGEMENT IN CELLULAR NETWORK

CROSS-REFERENCE TO RELATED APPLICATION(S)

This application is a continuation application, claiming priority under § 365(c), of an International application No. PCT/KR2023/006824, filed on May 19, 2023, which is based on and claims the benefit of an Indian provisional patent application number 202241029281, filed on May 20, 2022, in the Indian Intellectual Property Office, and of an Indian Complete patent application number 202241029281, filed on Apr. 18, 2023, in the Indian Intellectual Property Office, the disclosure of each of which is incorporated by reference herein in its entirety.

FIELD OF THE INVENTION

The disclosure relates to a field of wireless communication. More particularly, the disclosure relates to an application server assisted content management in a cellular network.

BACKGROUND

The number of mobile users and the demand for mobile data traffic is growing at an exponential rate. With the exponential growth of mobile data traffic, the demand for content-based traffic has also increased. A majority of the content-based traffic is duplicate in nature. For example, Video on Demand (VoD) services such as online video sharing and social media platforms. The VoD market is growing rapidly in recent years. Such content(s) demand puts a strain on a network (e.g., core network, base station, etc.).

Content Delivery Networks (CDNs) use caching at various places in a cloud that bring web pages and multimedia content closer to users. However, even with caching at various locations in the cloud to bring the content(s) closer to the users/end user(s), there is latency involved in delivering the content(s) to end users because the content(s) is stored in the cloud. To meet the demand for fifth generation (5G) services, a 5G cellular network must improve content(s) delivery latency.

Edge Computing is a technology that can deliver content with lower latency by caching the content(s) at an edge of the 5G cellular network (5G edge). The edge computing provides execution resources (compute and storage) for applications with networking close to the end user(s), typically within or near an operator network boundary. The edge computing reduces latency by bringing the execution resources in the 5G cellular network closer to the end user(s). Now, the edge computing can take place at either a virtual Radio Access Network (vRAN) or in an Operator's central data centers. The implementation of Edge computing at the vRAN reduces data transfer round-trip time (RTT) latency to about 5-20 ms. This is four times better performance than using the central data centers. As a result, the edge computing can improve user experiences by delivering data with lower latency.

FIG. 1 illustrates a pictorial representation of approximate RTT latency involved in delivering content in a 5G cellular network, according to the related art.

Referring to FIG. 1, an approximate Round-trip Time (RTT) latency involved in the content(s) delivery in the 5G cellular network is shown in FIG. 1, and the estimated RTT associated with various network entities is listed below.

At deep-edge, applications such as private Long-Term Evolution (LTE), critical Internet of Things (IoT), Augmented Reality (AR), Virtual Reality (VR), Artificial Intelligence (AI), and so on, the RTT latency is approximately 1-5 millisecond.

At the edge, for the applications such as the vRAN, edge computing, and so on, the RTT latency increases to approximately 5-20 milliseconds.

At central data centers for the applications using Content Delivery Networks (CDN), Information Management Systems (IMS), and so on, the RTT latency increases to approximately 20-100 milliseconds.

FIG. 2 is a sequence flow diagram illustrating an existing method for content management without a caching mechanism in the 5G edge, according to the related art.

Referring to FIG. 2, at operation 20, a User Equipment (UE) sends a request for a file (identity of the file (f_id)) to an application server via the cellular network. The request is also intercepted at a Packet Data Convergence Protocol (PDCP) layer, Centralized Unit-User Plane (CU-UP). The request is forwarded to an application server via the 5G edge. At operation 21, the PDCP layer performs an integrity check and decrypts a packet(s) as per a $3^{rd}$ Generation Partnership Project (3GPP) Technical Specification (TS) 38.323. At operation 22, the PDCP layer removes a PDCP header and forwards the packet(s) to a User Plane Function (UPF). At operation 23, the UPF then processes the packet(s), removes a general packet radio service tunnelling protocol user (GTP-U) header, and forwards the packet(s) to the application server. At operations 24 and 25, on receiving a request, the application server checks the request and transfers the file to the UE via the 5G network in multiple Internet Protocol (IP) packet format if the file packet size is greater than Maximum Transmission Unit (MTU) limit At operation 26, the UPF then on receiving the packet(s), adds the GTP-U header and forwards the packet(s) to the PDCP layer. At operations 27 and 28, the PDCP then performs encryption and integrity protection. The PDCP then adds the PDCP header and forwards the packet(s) to a lower layer (e.g., Radio Link Control (RLC) layer, Medium Access Control (MAC) layer, and Physical (PHY) layer) to send the packet(s) on a downlink to the UE. It can be seen from FIG. 2 that there is no cache mechanism between the UE and the application server. The existing method may perform a number of process/signaling steps for each request of the file/file id (e.g., video). There will be latency in delivering the content(s) to end users, resulting in a poor user experience, because the content(s) associated with the file is stored in the application server (cloud).

FIG. 3 illustrates an existing packet delivery mechanism from the application server to the UPF, according to the related art.

Referring to FIG. 3, the file being downloaded is delivered from the application server to the 5G UPF using the current packet delivery mechanism, which is listed below.

For Transmission Control Protocol (TCP) based traffic 31, a TCP layer divides the data into parts based on a Maximum Segment Size (MSS) value and sends it to the IP layer.

For User Datagram Protocol (UDP) based traffic 32, an application layer divides the data into sections based on the MTU supported by the IP layer.

The sent packets can be fragmented and reassembled (between routers depending on the MTU) in the transmission phase, i.e., between the IP layer (the application server and the UPF). The UPF always receives a reassembled IP packet that needs to be sent to the UE. The UPF then adds a general packet radio services (GPRS) Tunneling Protocol (GTP) header information and sends the IP packet to the lower layer for further processing and transferring of the packet to the UE.

In some existing methods, the content management is handled by a proxy mechanism (e.g., Radio Access Network (RAN) Cache (RANC)) in the 5G edge. Where the RANC acts as a double proxy component, intercepting user plane data for deep packet inspection and storing it as a file in the cache. The RANC also intercepts user requests and, if data is available, fulfills the request. The RANC also provides transport-level and application-level proxy operations to deliver data packets to the user (s). The RANC reduces hypertext transfer protocol (HTTP) traffic stress, lowers content delivery latency, and improves user experience by delivering content with lower latency. However, there are some issues with the proxy mechanism, which are illustrated in FIGS. 4 and 5.

FIG. 4 is a sequence flow diagram illustrating an existing method for the content management with the proxy mechanism in the 5G edge, according to the related art.

Referring to FIG. 4, at operation 40, the UE sends the request for the file from the application server via the PDCP layer. At operation 41, the PDCP performs the integrity check and decrypts the packet(s) as per the 3GPP specification. At operation 42a, the PDCP then removes the PDCP header and forwards the packet to a proxy server to check the UE request, and if the UE request can be fulfilled by a RAN cache. At operation 42b, the proxy server determines whether the UE request is fulfilled or not. At operation 42c, the proxy server informs the PDCP layer that the UE request is not fulfilled in response to determining that the UE request is not fulfilled by the proxy server.

At operation 43, the PDCP layer then forwards the GTP-U packet containing a request to the UPF. At operation 44, the UPF then processes the packet(s), removes the GTP-U header, and forwards the packet(s) to the application server. At operations 45 and 46, on receiving the request (i.e., UE request), the application server checks the request and transfers the file to the UE via 5G network in multiple IP packet format, if the file packet size is greater than the MTU limit At operation 47, on receiving the packet(s), the UPF adds the GTP-U header and forwards the packet(s) to the PDCP layer. At operations 48 and 49, the PDCP then performs the encryption and integrity protection. The PDCP then adds the PDCP header and forwards the packet(s) to the lower layer to send the packet(s) on the downlink to the UE. For the content management with the proxy mechanism, all packets from the UE may go through some additional step(s) as compared to FIG. 2, even if the UE request cannot be fulfilled by the cache. As a result, there is additional latency to fulfill such UE request(s) and overhead at the RAN to check each packet from the UE. Such additional operation adds complexity and overhead to the RAN because an operator should set up the proxy server, which will provide application, transport, and Internet Protocol (IP) services at the RAN.

FIG. 5 is a sequence flow diagram illustrating the existing method for the content management with the proxy mechanism in the 5G edge, according to the related art.

Referring to FIG. 5, in the sequence flow diagram, an N-proxy server is installed at the RAN, which is associated with an N-application server. At operation 50, the UE sends the request for a file (i.e., y channel) from the application server (i.e., Y-channel application server) via the PDCP layer. At operation 51, the PDCP performs the integrity check and decrypts the packet(s) as per the 3GPP specification. At operation 52a, the PDCP then removes the PDCP header and forwards the packet to a proxy server (i.e., N-proxy server) to check the UE request (i.e., y channel), if the UE request can be fulfilled by the N-proxy server. At operation 52b, the N-proxy server determines whether the UE request is fulfilled or not. At operation 52c, the N-proxy server informs the PDCP layer that the UE request is not fulfilled in response to determining that the UE request is not fulfilled by the N-proxy server. The N-proxy server sends a negative acknowledgment to the PDCP layer for the received UE request (i.e., y channel). At operation 53, the PDCP layer then forwards the GTP-U packet containing the request to the UPF. At operation 54, the UPF then processes the packet(s), removes the GTP-U header, and forwards the packet(s) to the Y-channel application server. At operations 55 and 56, on receiving the request (i.e., UE request), the Y-channel application server checks the request and transfers the file to the UE via the 5G network in multiple IP packet format, if the file packet size is greater than the MTU limit At operation 57, on receiving the packet(s), the UPF adds the GTP-U header and forwards the packet(s) to the PDCP layer. At operations 58 and 59, the PDCP then performs the encryption and integrity protection. The PDCP then adds the PDCP header and forwards the packet(s) to the lower layer to send the packet(s) on the downlink to the UE.

Referring to FIG. 5, the existing method for the content management with the proxy mechanism has various limitations/disadvantages, which are listed here. (a) Content security is a critical aspect in today's content-based world. Contents transmitted to the UE via RAN/Core may be in an unfamiliar format (encrypted at source). As a result, deep inspection of the packet(s) and identification of the content is not always possible at the RAN/Core. (b) Further, intercepting a connection in the RAN and including a proxy device (i.e., proxy server) in the RAN that can be interpreted as proxy protocols IP, GTP-U, transport (TCP/UDP), or application is not always possible. Because that will increase processing overhead at the RAN, where the existing method may check each UE request. Furthermore, some of these protocol operations may be dependent on the functionality of the end UE and the application server. Referring to FIG. 5, the PDCP layer is unable to determine whether the received file (f_id) is associated with the N-application server or the Y-channel application server. Even if the cache/N-proxy server cannot fulfill the UE request, the UE may go through some additional step(s) compared to FIG. 2. As a result, there is additional latency to fulfill such UE request(s) and overhead at the RAN to check each packet from the UE. This step adds complexity and overhead to the RAN because an operator may set up the proxy server, which will provide application, transport, and IP services at the RAN. (c) Furthermore, the existing method has very limited scope as the multimedia contents are often transmitted in multiple packets, thus intercepting, and identifying the packet(s) in the RAN to check if the packet(s) belong to the same file is not always possible.

Thus, it is desired to address the above-mentioned disadvantages or other shortcomings or at least provide a useful alternative for the content management in the cellular network.

The above information is presented as background information only to assist with an understanding of the disclosure. No determination has been made, and no assertion is made, as to whether any of the above might be applicable as prior art with regard to the disclosure.

SUMMARY

This summary is provided to introduce a selection of concepts, in a simplified format, which is further described in the detailed description of the disclosure. This summary is neither intended to identify key or essential inventive concepts of the disclosure nor is it intended for determining the scope of the disclosure.

Aspects of the disclosure are to address at least the above-mentioned problems and/or disadvantages and to provide at least the advantages described below. Accordingly, an aspect of the disclosure is to provide an application server assisted content management in a cellular network.

Additional aspects will be set forth in part in the description which follows and, in part, will be apparent from the description, or may be learned by practice of the presented embodiments.

In accordance with an aspect of the disclosure, a method for content management in a cellular network is provided. The method includes receiving, by an application server, a content request comprising a file identity from a User Equipment (UE), performing, upon receiving the content request, by the application server, at least one action associated with content caching, content retrieval, and content deletion, assigning, by the application server, one or more assisting parameters in a header of an Internet Protocol (IP) packet, based on the at least one performed action, and assisting, by the application server, at least one of a User Plane Function (UPF) device, and a Packet Data Convergence Protocol (PDCP) device of the cellular network (e.g., edge of 5G cellular network) to manage content, based on the one or more assigned assisting parameters.

In accordance with another aspect of the disclosure, an application server for the content management in the cellular network is provided. The application server includes a memory, a processor, and a content management module, operably connected to the memory and the processor. The content management module is configured to receive the content request comprising the file identity from the UE, perform, upon receiving the content request, at least one action associated with the content caching, the content retrieval, and the content deletion, assign one or more assisting parameters in a header of the IP packet, based on the at least one performed action, and assist at least one of the UPF device, and the PDCP device of the cellular network (e.g., edge of 5G cellular network) to manage content, based on the one or more assigned assisting parameters.

In accordance with another aspect of the disclosure, a UPF device for the content management in the cellular network is provided. The UPF device includes a memory, a processor, and a content management module, operably connected to the memory and the processor. The content management module is configured to receive at least one of a header information associated with the IP packet and a content packet data associated with the content from the application server, with the one or more assigned assisting parameters, determine whether a cache bit is enabled or disabled and whether a retrieve bit is enabled or disabled upon receiving the one or more assigned assisting parameters from the application server, perform one of caching, to a Radio Access Network (RAN) core database, the received content packet data based on the file identity, and a part identity in response to determining that the cache bit is enabled, and the retrieve bit is disabled, retrieving, from the RAN core database, the cached content packet data based on the file identity, and the part identity in response to determining that the cache bit is disabled, and the retrieve bit is enabled, and adding the header information in the stored content packet data, or deleting, from the RAN core database, the cached content packet data based on the file identity, and/or the part identity associated with the file identity in response to determining that the cache bit is enabled, and the retrieve bit is enabled, and send the content to the PDCP device when the content associated with the file identity is available at the cellular network.

In accordance with another aspect of the disclosure, a PDCP device for the content management in the cellular network is provided. The PDCP device includes a memory, a processor, and a content management module, operably connected to the memory and the processor. The content management module is configured to retrieve at least one of the header information associated with the IP packet and the content packet data associated with the content from an application server via the UPF device, with one or more assigned assisting parameters, determine whether the cache bit is enabled or disabled and whether the retrieve bit is enabled or disabled upon receiving the one or more assigned assisting parameters from the application server, perform one of caching, in a Centralized Unit (CU)-User Plane (UP) database, the received content packet data based on the file identity, and the part identity in response to determining that the cache bit is enabled, and the retrieve bit is disabled, retrieving, from the CU-UP database, the cached content packet data based on the file identity, and the part identity in response to determining that the cache bit is disabled, and the retrieve bit is enabled, and adding the header information in the stored content packet data, or deleting, from the CU-UP database, the cached content packet data based on the file identity, and the part identity in response to determining that the cache bit is enabled, and the retrieve bit is enabled, and send the content associated with a content request to the UE when the content associated with the file identity is available at the cellular network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates an existing packet delivery mechanism from an application server to the UPF, according to the related art;

FIG. 7 is a flow diagram illustrating a method for the content management in the 5G cellular network, according to an embodiment of the disclosure;

Throughout the drawings, it should be noted that like reference numbers are used to depict the same or similar elements, features, and structures.

DETAILED DESCRIPTION OF FIGURES

Figure 1:
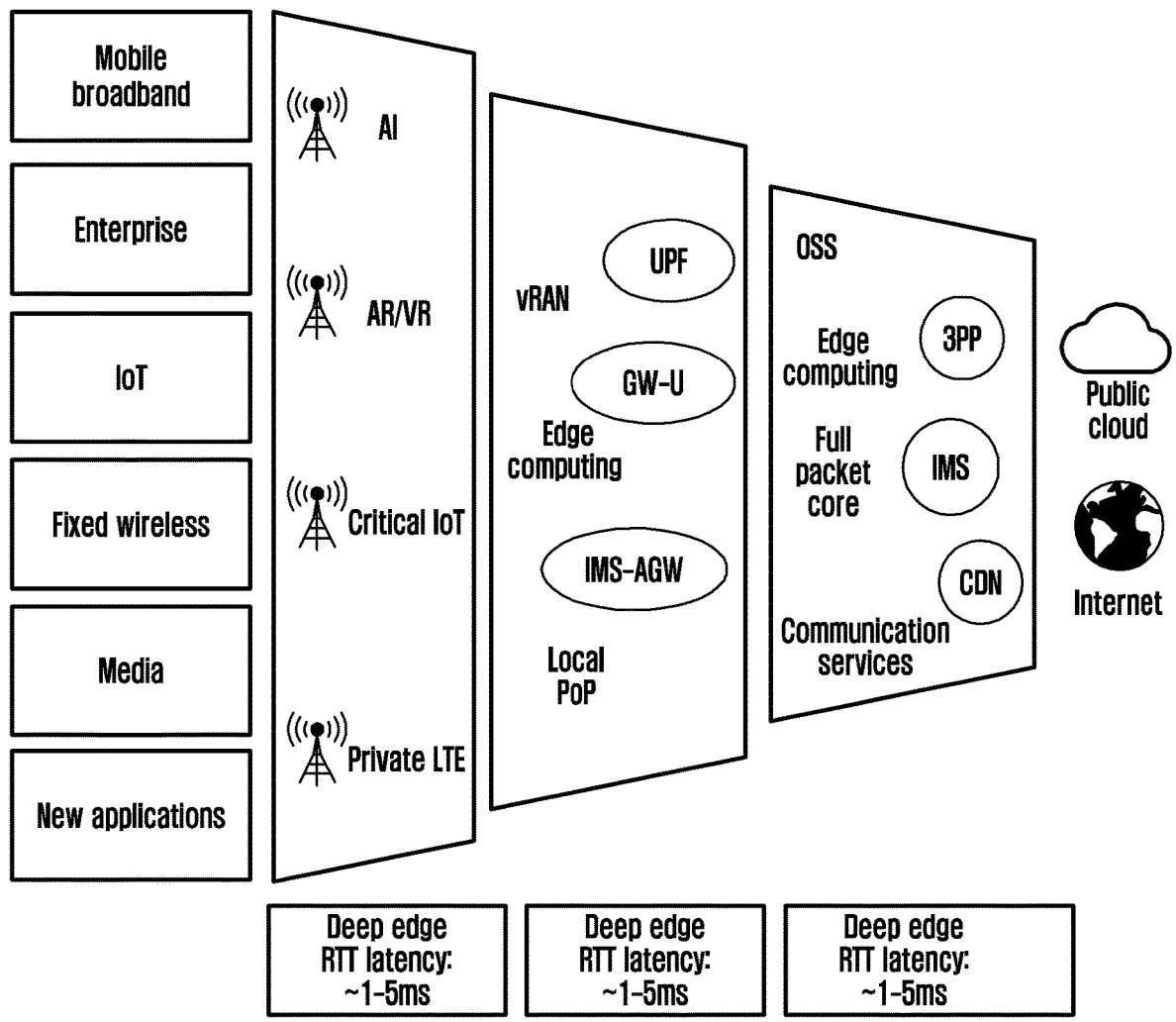
FIG. 1 illustrates a pictorial representation of approximate RTT latency involved in delivering content in a 5G cellular network, according to the related art.
Figure 2:
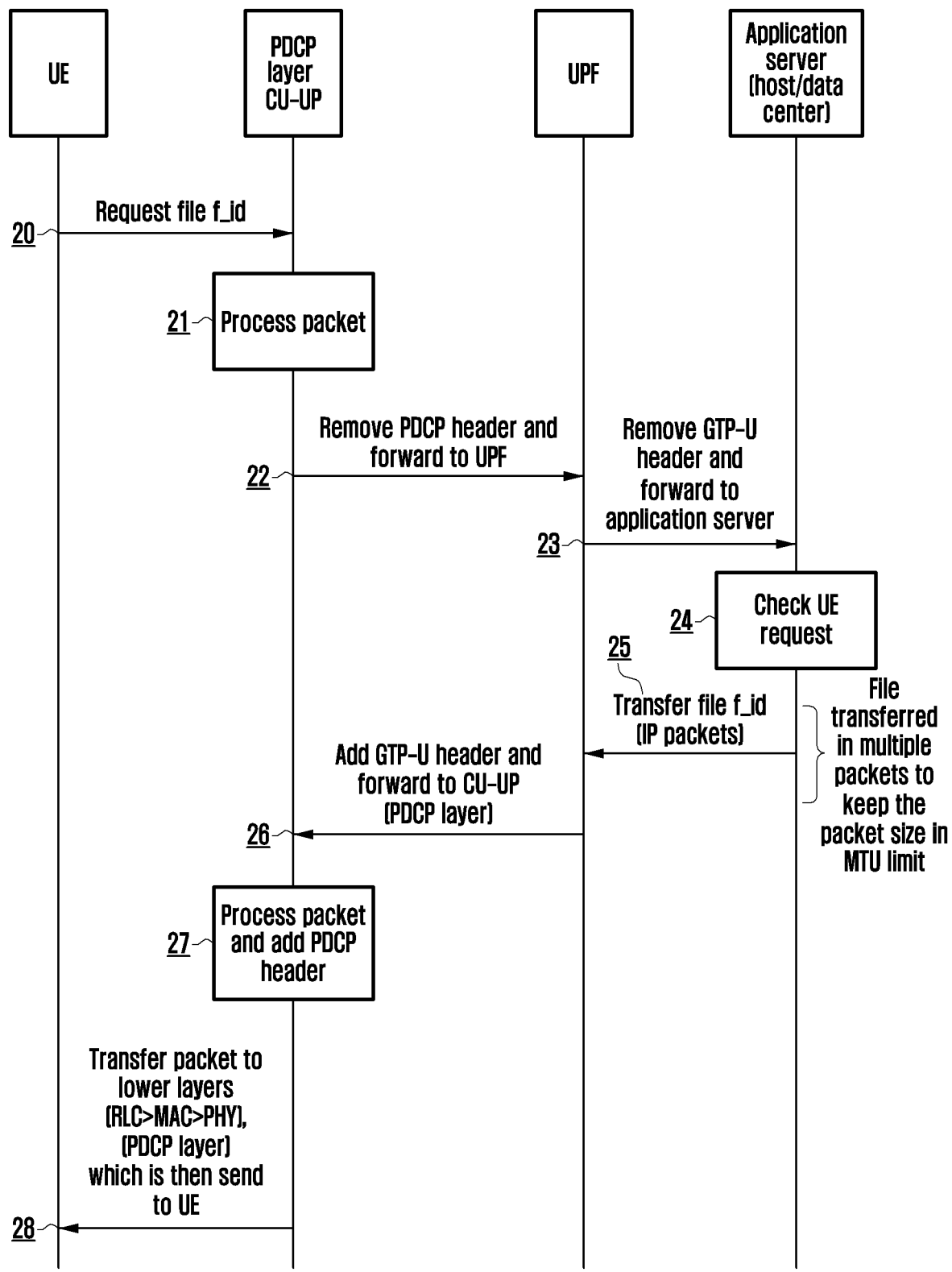
FIG. 2 is a sequence flow diagram illustrating an existing method for content management without a caching mechanism in the 5G cellular network, according to the related art.
Figure 4:
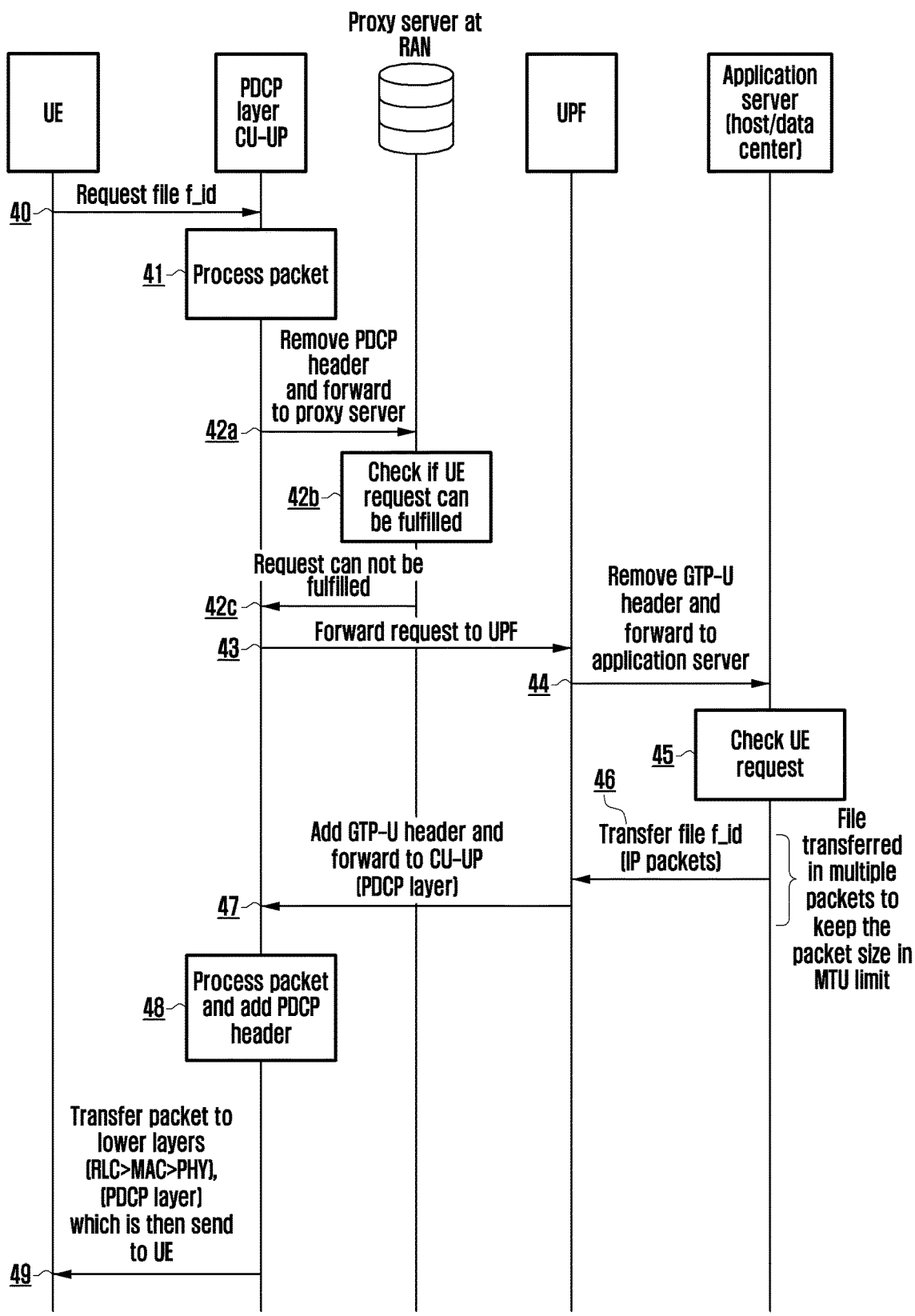
FIG. 4 is a sequence flow diagram illustrating an existing method for content management with a proxy mechanism in the 5G cellular network, according to the related art.
Figure 5:
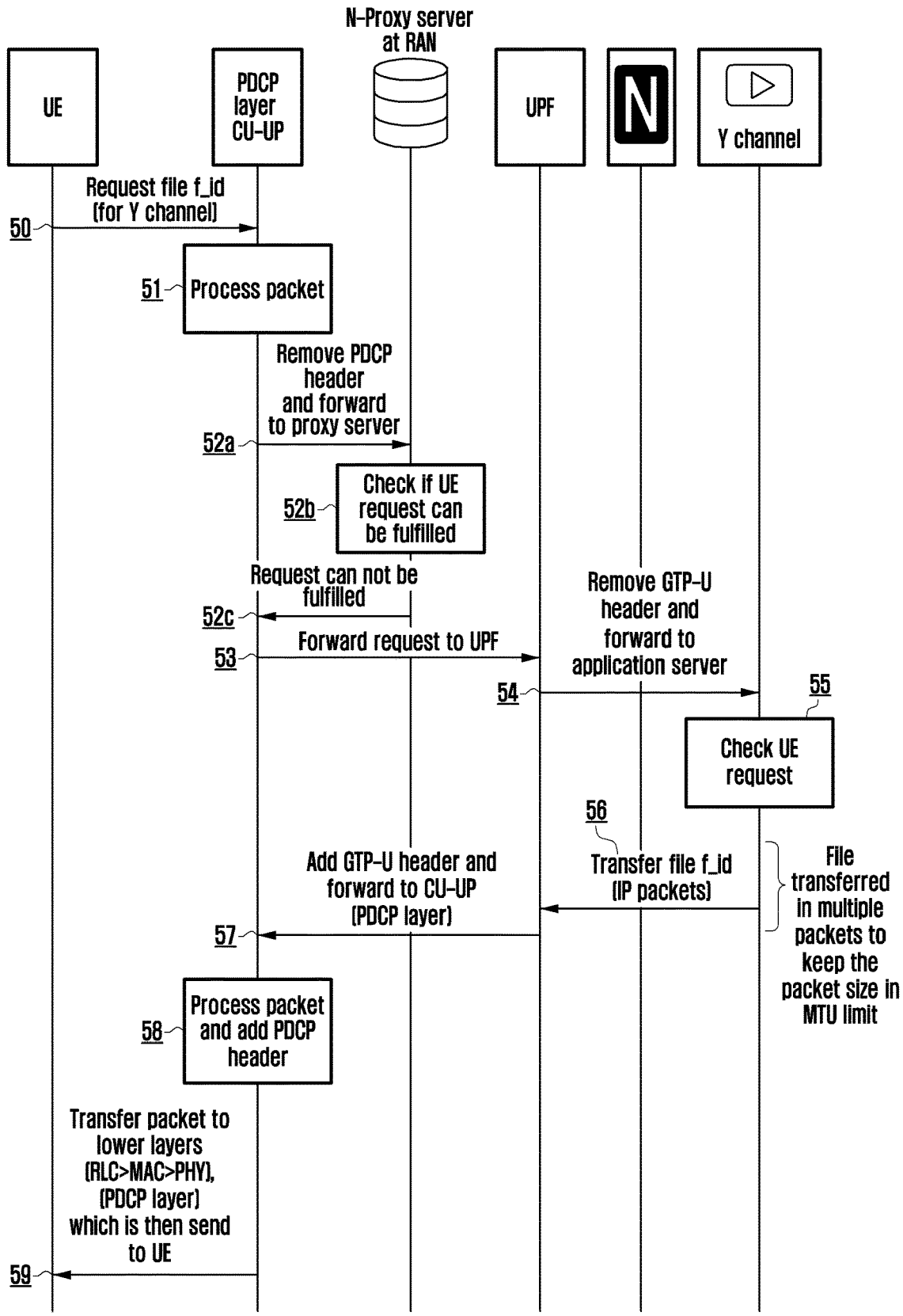
FIG. 5 is a sequence flow diagram illustrating the existing method for content management with the proxy mechanism in the 5G cellular network, according to the related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in one embodiment", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Referring now to the drawings, and more particularly to FIGS. 6, 7, 8A, 8B, 9 to 16, and 17, where similar reference characters denote corresponding features consistently throughout the figures, there are shown preferred embodiments.

Figure 6:
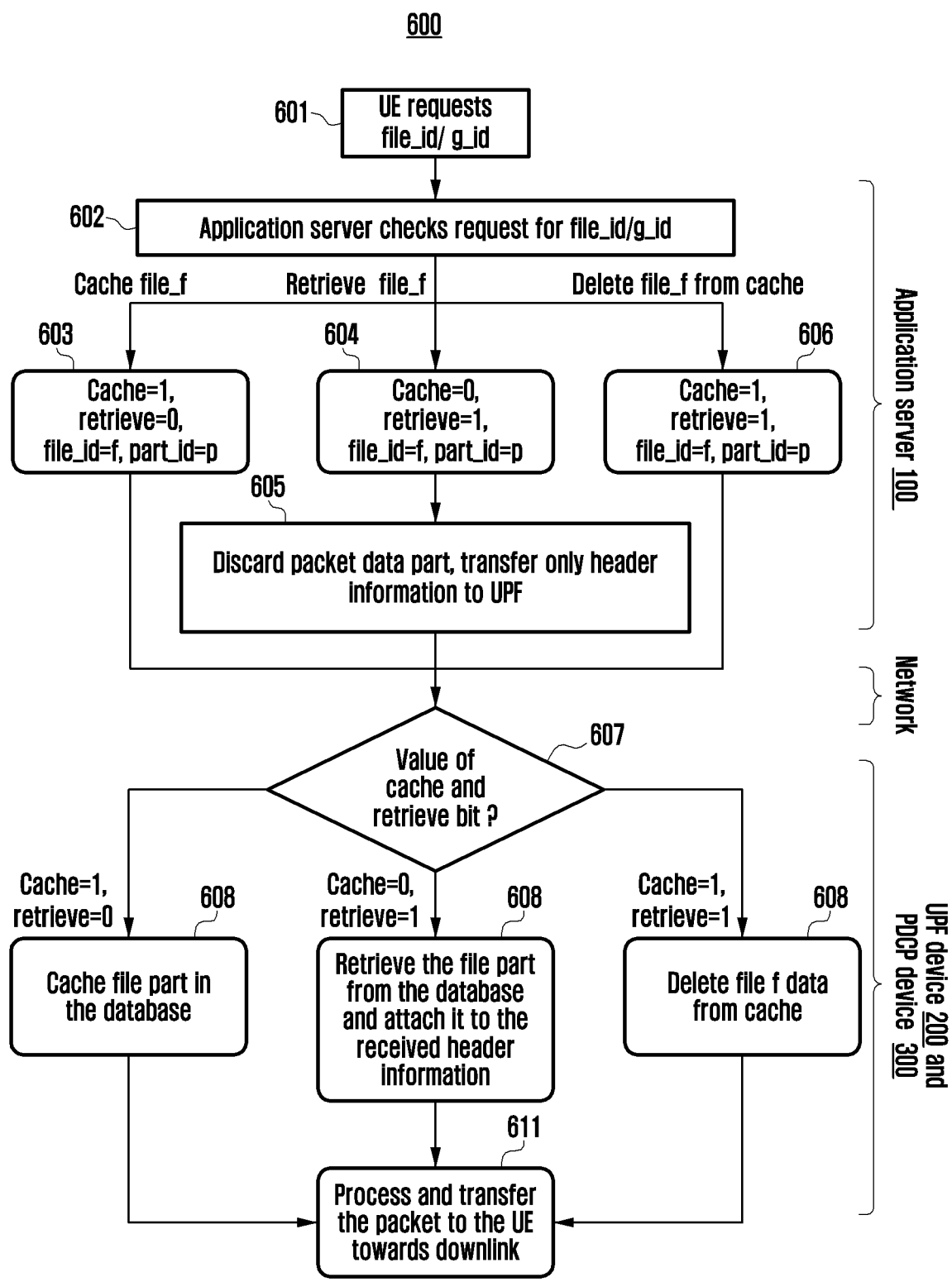
FIG. 6 is a flow diagram illustrating a system for content management in the 5G cellular network, according to an embodiment of the disclosure.

FIG. 6 is a flow diagram illustrating a system 600 for content management in the 5G cellular network (e.g., edge of the 5G cellular network), according to an embodiment of the disclosure.

Referring to FIG. 6, the system 600 includes an application server 100, a User Plane Function (UPF) device 200, a Packet Data Convergence Protocol (PDCP) device 300, and a User Equipment (UE) 400 operatively in communication with each other.

At operation 601, the UE 400 sends a content request to the application server 100 (e.g., a video server, a multimedia server, a social media platform server, etc.). The content request comprises a file identity (f_id and/or g_id), that indicates a user of the UE 400 wants to access a particular content (e.g., video file) associated with the file identity. At operation 602, the application server 100 determines whether the content needs to be a cache/retrieve/delete to/from a database (e.g., RAN core database or CU-UP database) based on one or more cache parameters and/or prior knowledge of the application server 100. Examples the cache parameters include, but are not limited to, a popularity of content associated with the file identity, a geography of the UE 400, and a profile of the content.

Figure 8A:
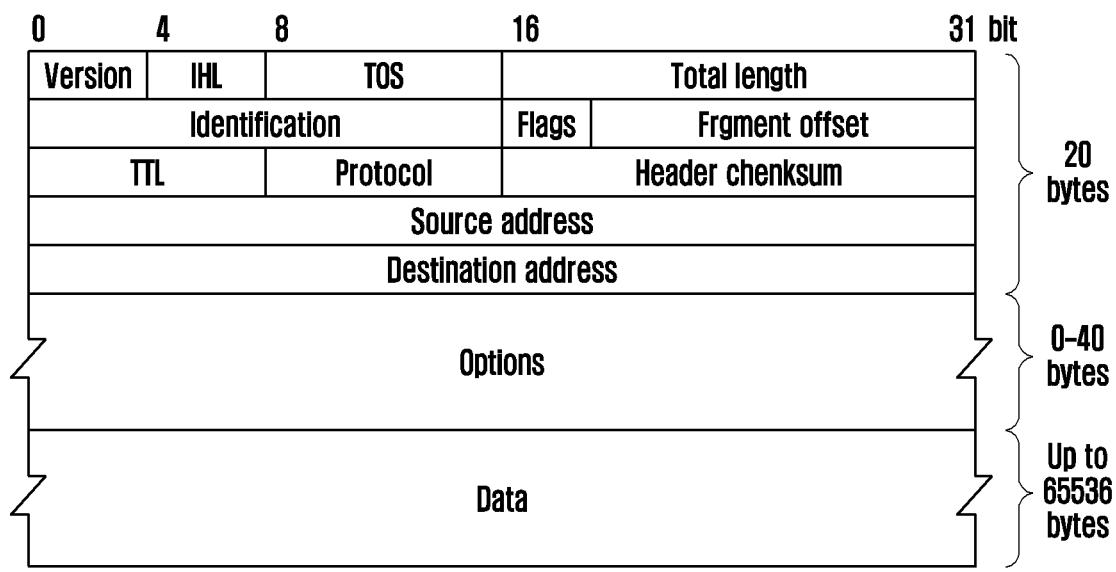
FIGS. 8A and 8B illustrate IPv4 and Ipv6 packet format used for the content management in the 5G cellular network, according to various embodiments of the disclosure.
Figure 8B:
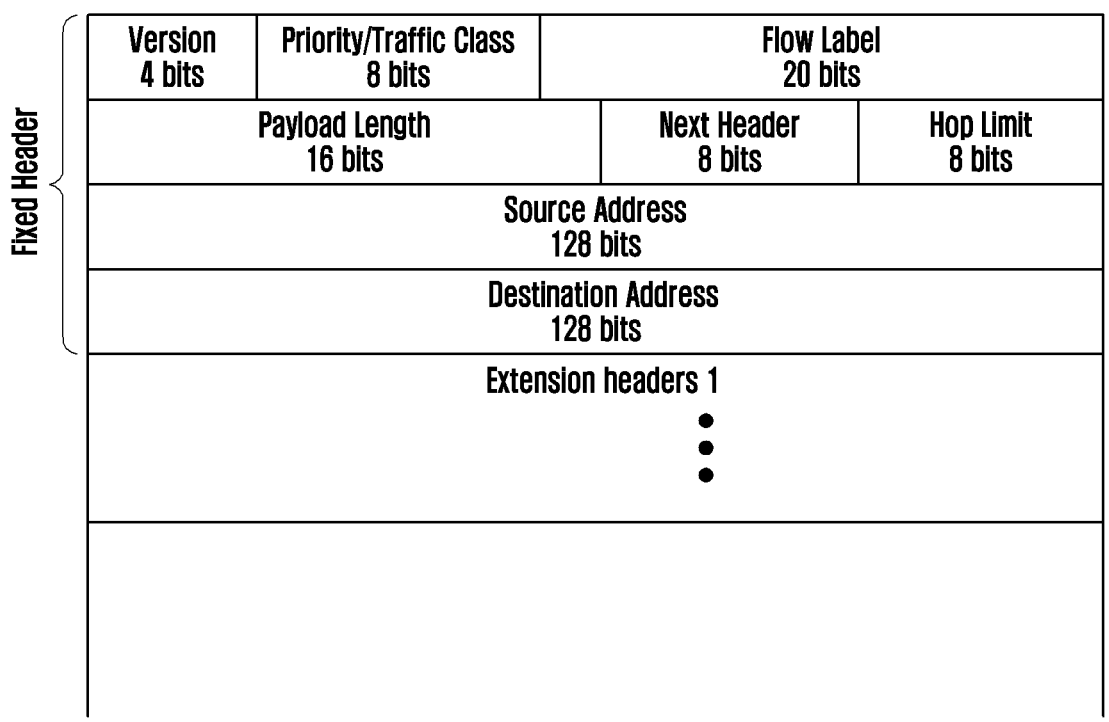

At operations 603, 604, and 605, the application server 100 assigns one or more assisting parameters in an option field of an Internet Protocol Version Four (IPv4) packet, as illustrated in FIG. 8A, or an extension header of an Internet Protocol Version Six (IPv6) packet, as illustrated in FIG. 8B, based on the need of the content. The one or more assisting parameters comprise at least one of a cache bit, a retrieve bit, the file identity, and a part identity of the file identity. Each part identity and file identity are associated with a specific packet content, as shown in Table 1.

TABLE 1

| File_id | Part_id | Packet content |
|---------|---------|----------------|
| 1 | 0 | Packet-1 |
| 1 | 1 | Packet-2 |
| 2 | 0 | Packet-3 |
| ... | ... | ... |

At operation 603, the application server 100 enables the cache bit, disables the retrieve bit, and adds the file identity and the part identity in response to determining that the received file identity needs to be cached in the database.

At operation 604, the application server 100 disables the cache bit, enables the retrieve bit, and adds the file identity and the part identity in response to determining that the received file identity needs to be retrieved from the database. As the received file identity needs to be retrieved from the database, at operation 605, the application server 100 discards the packet data part and transfers only header information to the UPF device 200, which saves network resources, makes the process faster, and enhances the user's experience. Consider a scenario where the user's requested file identity (f_id) size is one gigabyte (GB). In this scenario, the application server (100) has to share the header information with the UPF device 200, which is in kilobytes (e.g., 2 kb). As a result, the disclosed method conserves network resources, accelerates processes, and improves user experience.

At operation 606, the application server 100 enables the cache bit, enables the retrieve bit, and adds the file identity and the part identity in response to determining that the received file identity needs to be deleted from the database.

At operation 607, the UPF device 200 or PDCP device 300 determines whether the cache bit is enabled or disabled, and whether the retrieve bit is enabled or disabled upon receiving the one or more assigned assisting parameters from the application server 100. The cache bit/retrieve bit value indicates the specific action that may be performed by the UPF device 200 or PDCP device 300 for the content management, as shown in Table 2.

TABLE 2

| Cache bit | Retrieve bit | Working |
|-----------|--------------|---------|
| 0 | 0 | Do not cache/retrieve |
| 0 | 1 | Retrieve the packets from the database |
| 1 | 0 | Cache the packets in the database |
| 1 | 1 | Remove the packets that belong to File f_id |

At operation 608, the UPF device 200 or PDCP device 300 caches content packet data based on the file identity, and the part identity in the database in response to determining that the cache bit is enabled, and the retrieve bit is disabled.

At operation 609, the UPF device 200 or PDCP device 300 retrieves the cached content packet data based on the file identity, and the part identity from the database in response to determining that the cache bit is disabled, and the retrieve bit is enabled.

At operation 610, the UPF device 200 or PDCP device 300 deletes the cached content packet data based on the file identity, and the part identity from the database in response to determining that the cache bit is enabled, and the retrieve bit is enabled.

At operation 611, the UPF device 200 or PDCP device 300 processes and transfers the packets/requested content associated with the file identity (f_id) to the UE (400) using the downlink channel.

The database (e.g., RAN-Core (UPF) or CU-UP (PDCP)) uses the file identity, and the part identity as key parameters to store/retrieve/delete the content in/from the database.

For content caching, header information of the packet(s) and packet data (header +packet_data) is transmitted over a network to the UPF device 200 or the PDCP device 300. Only the packet data (packet_data) is stored in the database.

For content retrieval, only the header information is transmitted over the network to the UPF device 200 or the PDCP device 300. The UPF device 200 or the PDCP device 300 then uses the file identity, and the part identity to retrieve the content part from the database. After retrieving the content, the content part is added to the header and the rest of the operation(s) of the UPF device 200 and the PDCP device 300 will be the same as explained in the existing method.

FIG. 7 is a flow diagram illustrating a method 700 for the content management in the 5G cellular network, according to an embodiment of the disclosure.

Referring to FIG. 7, at operation 701, the method(700 includes receiving, by the application server 100, the content request comprising the file identity from the UE 400, which relates to operations 601-602 of FIG. 6. In one embodiment, the file identity is associated with one or more contents of the application server 100. Examples of the one or more contents may include but are not limited to, video content, music content, and webinar content or any multimedia content.

At operation 702, the method 700 includes performing, upon receiving the content request, by the application server 100, at least one action associated with the content caching, the content retrieval, and the content deletion, which relates to operations 603 to 606 of FIG. 6. In one embodiment, the application server 100 determines whether to cache the content associated with the file identity, to a Radio Access Network (RAN) core database or Centralized Unit (CU)- User Plane (UP) database based on the one or more cache parameters. The one or more cache parameters comprise at least one of a popularity of the content associated with the file identity, the geography of the UE 400, and the profile of the content. In one embodiment, the application server 100 determines that the content associated with the file identity has been cached at the RAN core database or CU-UP database and whether to retrieve the content associated with the file identity, from the RAN core database or CU-UP database. In one embodiment, the application server 100 determines that the content associated with the file identity has been cached at the RAN core database or CU-UP database and whether to delete the content associated with the file identity, from the RAN core database or CU-UP database based on the one or more cache parameters. In one embodiment, the application server (100) creates the RAN core database at the UPF device (200) or the CU-UP database (300A) at the PDCP device (300) for the at least one action.

At operation 703, the method 700 includes assigning, by the application server 100, the one or more assisting parameters in a header of an Internet Protocol (IP) packet, based on the at least one performed action, which relates to operations 603 to 606 of FIG. 6. The one or more assisting parameters comprise at least one of the cache bit, the retrieve bit, the file identity, and the part identity of the file identity. In one embodiment, the header of the IP comprises one of an option field of an IP Version Four (IPv4) and an extension of an IP Version Six (IPv6).

At operation 704, the method 700 includes assisting, by the application server (100), at least one of the UPF device 200, and the PDCP device (300) of the 5G cellular network to manage content, based on the one or more assigned assisting parameters, which relates to operations 607 to 611 of FIG. 6.

In addition, the UPF device 200 receives at least one of the header information associated with the IP packet and the content packet data associated with the content from the application server 100, with the one or more assigned assisting parameters. The UPF device 200 then determines whether the cache bit is enabled or disabled and whether the retrieve bit is enabled or disabled upon receiving the one or more assigned assisting parameters from the application server 100. The UPF device 200 then performs at least one of the following actions.

The UPF device 200 caches, to the RAN core database, the received content packet data based on the file identity, and the part identity in response to determining that the cache bit is enabled, and the retrieve bit is disabled.

The UPF device 200 retrieves, from the RAN core database, the cached content packet data based on the file identity, and the part identity in response to determining that the cache bit is disabled, and the retrieve bit is enabled, and adding the header information in the stored content packet data.

The UPF device 200 deletes, from the RAN core database, the cached content packet data based on the file identity, and the part identity in response to determining that the cache bit is enabled, and the retrieve bit is enabled.

In addition, the application server 100 transmits the header information, and the content packet data to the UPF device 200 for the content caching based on the one or more cache parameters.

In addition, the application server 100 transmits the header information only to the UPF device 200 for content retrieval when the application server 100 determines that the content associated with the file identity has been cached at the RAN core database.

In addition, the UPF device 200 stores the content packet data in the RAN core database 200A, for the content caching based on the one or more cache parameters.

In addition, the UPF device 200 adds the content to header information associated with the IP packet from the RAN core database 200A, for content retrieval.

In addition, the PDCP device 300 receives at least one of the header information associated with the IP packet and the content packet data associated with the content from the application server 100 via the UPF device 200, with the one or more assigned assisting parameters. The PDCP device 300 then determines whether the cache bit is enabled or disabled and whether the retrieve bit is enabled or disabled upon receiving the one or more assigned assisting parameters from the application server 100. The PDCP device 300 then performs at least one of the following actions.

The PDCP device 300 caches, in the CU-UP database, the received content packet data based on the file identity, and the part identity in response to determining that the cache bit is enabled, and the retrieve bit is disabled.

The PDCP device 300 retrieves, from the CU-UP database, the cached content packet data based on the file identity, and the part identity in response to determining that the cache bit is disabled, and the retrieve bit is enabled, and adding the header information in the stored content packet data.

The PDCP device 300 deletes, from the CU-UP database 300A, the cached content packet data based on the file identity, and the part identity in response to determining that the cache bit is enabled, and the retrieve bit is enabled.

In addition, the application server 100 transmits the header information, and the content packet data to the PDCP device 300 via the UPF device 200 for the content caching based on the one or more cache parameters.

In addition, the application server 100 transmits the header information to the PDCP device 300 via the UPF device 200 for the content retrieval when the application server 100 determines that the content associated with the file identity has been cached at the CU-UP database.

In addition, the PDCP device 300 stores the content packet data only in the CU-UP database 300A, for the content caching based on the one or more cache parameters.

In addition, the PDCP device 300 adds the content to the header of the IPv4 packet or the IPv6 packet from the RAN core database 200A, for the content retrieval.

In addition, the application server 100 receives the content request from the UE 400 for the content. The application server 100 then determines the availability of the requested content in the RAN core database or the CU-UP database. The application server 100 then causes to cache the requested content in the 5G cellular network, when the requested content is not available at the RAN core database or the CU-UP database, wherein the 5G cellular network sends the requested content to the UE 400 after the content is cached in the 5G cellular network.

In addition, in one embodiment, the application server 100 causes to predict a possibility of recurrence of the content request for the content by at least one or more UEs. The application server 100 then sends based on a prediction, the content request to the 5G cellular network wherein the content request comprises the one or more assisting parameters.

FIGS. 8A and 8B illustrate IPv4 and IPv6 packet formats used for the content management in the 5G cellular network, according to various embodiments of the disclosure.

Referring to FIG. 8A, the application server 100 assigns the one or more assisting parameters in an option field of an Internet Protocol Version Four (IPv4) packet and sends it to the UPF device 200 or the PDCP device 300 for the content management, as discussed throughout the disclosure, as described in conjunction with FIGS. 9 to 14.

Referring to FIG. 8B, the application server 100 assigns the one or more assisting parameters in an extension header of an Internet Protocol Version Six (IPv6) packet and sends it to the UPF device 200 or the PDCP device (300) for the content management, as discussed throughout the disclosure, as described in conjunction with FIGS. 9 to 14.

Figure 9:
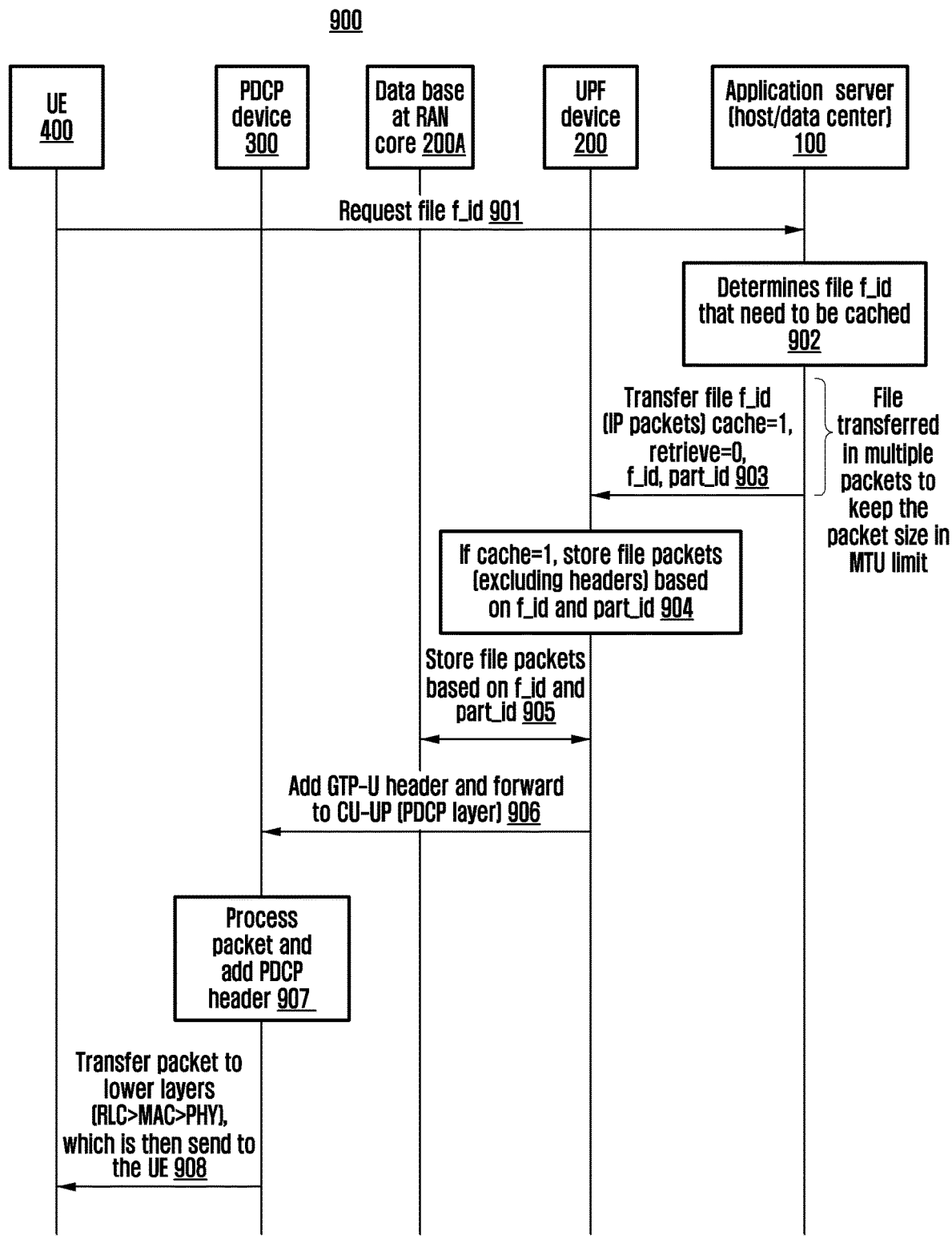
FIG. 9 is a flow diagram illustrating a method for caching content file(s) at a RAN-core database in the 5G cellular network using an application server, according to an embodiment of the disclosure.

FIG. 9 is a flow diagram illustrating a method 900 for caching content file(s) at the RAN-core database (200A) in the 5G cellular network using the application server (100), according to an embodiment of the disclosure.

Referring to FIG. 9, at operation 901, the UE 400 sends the content request comprising the file identity (f_id) (e.g., the identity associated with video content) to the application server 100, which relates to operation 701 of FIG. 7.

At operation 902, upon receiving the content request, the application server 100 determines whether to cache/retrieve/delete the content associated with the file identity, from the RAN-core database 200A based on the one or more cache parameters and/or prior knowledge of the application server 100, which relates to operation 702 of FIG. 7. Examples of one or more cache parameters include, but are not limited to, the popularity of content associated with the file identity, the geography of the UE 400, and the profile of the content.

At operation 903, after determining that the content may be cached at the RAN-core database 200A, the application server 100 performs a basic operation of segmentation, where the content file(s) is transferred in multiple packets (content packet data) to keep the packet size within an MTU limit The application server 100 then assigns the one or more assisting parameters (i.e., cache bit=1, retrieve bit=0, f_id, part_id) in the header of the IP (i.e., the option field of the IPv4 or the extension of the IPv6), which relates to operation 703 of FIG. 7 and sends the one or more assisting parameters and the content packet data to the UPF device 200.

At operations 904 and 905, the UPF device 200 determines whether the cache bit is enabled or disabled and whether the retrieve bit is enabled or disabled upon receiving the one or more assigned assisting parameters from the application server 100, which relates to operation 704 of FIG. 7. The UPF device 200 removes the header information (header of the IP). The UPF device 200 then caches, in the RAN-core database 200A, the received content packet data based on the file identity, and the part identity in response to determining that the cache bit is enabled, and the retrieve bit is disabled.

At operation 906, the UPF device 200 performs a standard operation such as adding a GTP-U header and forwarding content packet data to the PDCP device (300), which relates to operation 704 of FIG. 7.

At operation 907, the PDCP device 300 performs a standard operation such as processing the received content packet data from the UPF device 200 and adding a PDCP header in the received content packet data, which relates to operation 704 of FIG. 7.

At operation 908, the PDCP device 300 transfers the processed content packet data to a lower layer(s) (e.g., RLC, MAC, PHY) and then sends the processed content packet data to the UE 400, which relates to operation 704 of FIG. 7.

Figure 10:
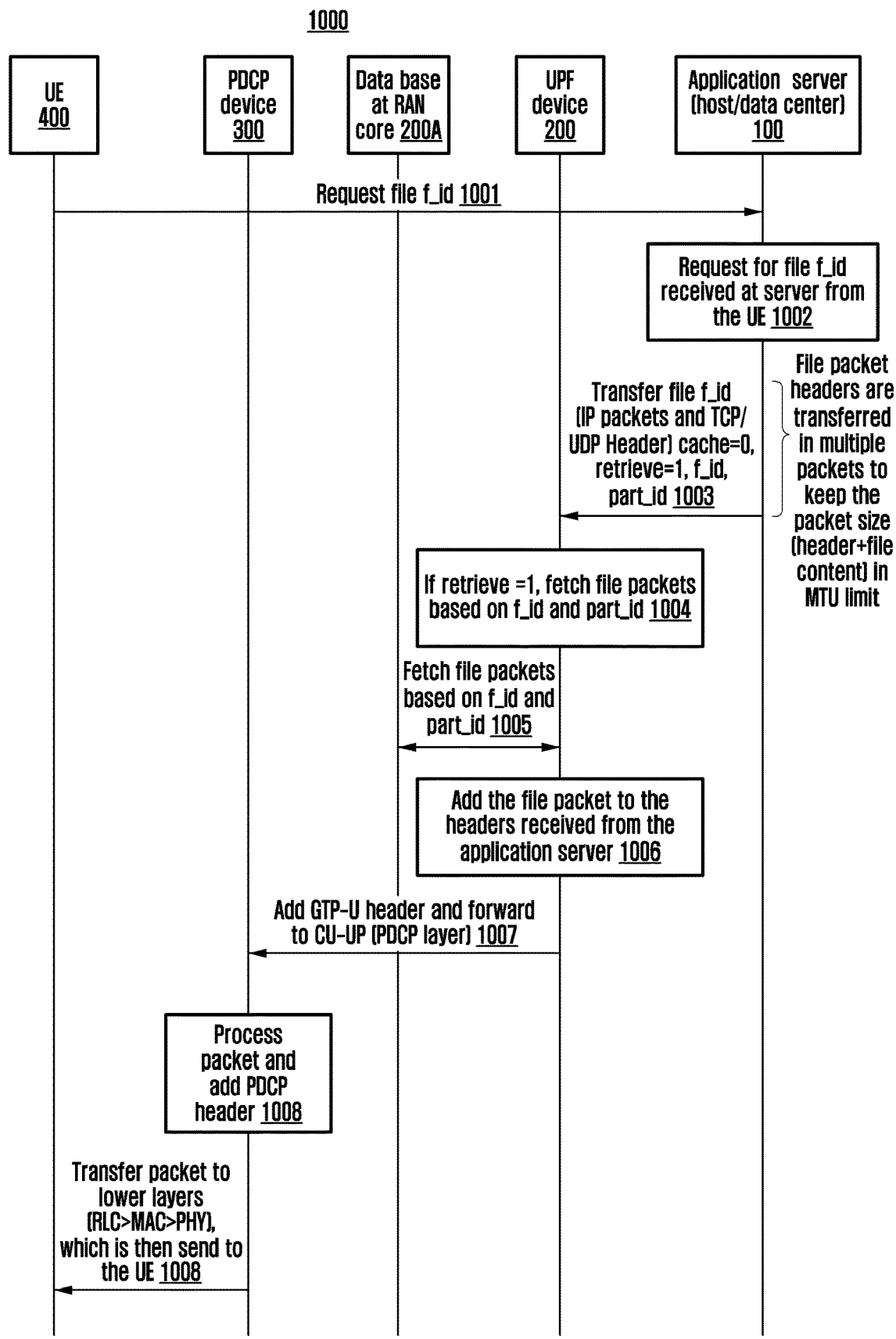
FIG. 10 is a flow diagram illustrating a method for retrieving/serving content file(s) from the RAN-core database in the 5G cellular network using the application server, according to an embodiment of the disclosure.

FIG. 10 is a flow diagram illustrating a method 1000 for retrieving/serving content file(s) from the RAN-core database 200A in the 5G cellular network using the application server 100, according to an embodiment of the disclosure.

Referring to FIG. 10, at operation 1001, the UE 400 sends the content request comprising the file identity (f_id) (e.g., the identity associated with video content) to the application server 100, which relates to operation 701 of FIG. 7.

At operation 1002, upon receiving the content request, the application server 100 determines whether to cache/retrieve/delete the content associated with the file identity, from the RAN-core database 200A based on the one or more cache parameters and/or prior knowledge of the application server 100, which relates to operation 702 of FIG. 7. Example of one or more cache parameters includes, but are not limited to, the popularity of content associated with the file identity, the geography of the UE 400, and the profile of the content.

At operation 1003, after determining that the content may be retrieved from the RAN-core database 200A, the application server 100 performs the basic operation of segmentation, where the content file(s) is transferred in multiple packets (content packet data) to keep the packet size (header+content packet data) within the MTU limit The application server 100 then assigns the one or more assisting parameters (i.e., cache bit=0, retrieve bit=1, f_id, part_id) in the header of the IP (i.e., the option field of the IPv4 or the extension of the IPv6), which relates to operation 703 of FIG. 7 and sends the header information and the one or more assisting parameters to the UPF device 200 (excluding content packet data).

At operations 1004 and 1005, the UPF device (200) determines whether the cache bit is enabled or disabled and whether the retrieve bit is enabled or disabled upon receiving the one or more assigned assisting parameters from the application server 100, which relates to operation 704 of FIG. 7. The UPF device 200 then retrieves, from the RAN-core database 200A, the content packet data based on the file identity, and the part identity in response to determining that the cache bit is disabled, and the retrieve bit is enabled.

At operation 1006, the UPF device 200 then adds all header information received from the application server 100 to the retrieved content packet data, which relates to operation 704 of FIG. 7.

At operation 1007, the UPF device 200 performs the standard operation such as adding the GTP-U header and forwarding content packet data to the PDCP device 300, which relates to operation 704 of FIG. 7.

At operation 1008, the PDCP device 300 performs the standard operation such as processing the received content packet data from the UPF device 200 and adding a PDCP header in the received content packet data, which relates to operation 704 of FIG. 7.

At operation 1009, the PDCP device 300 transfers the processed content packet data to the lower layer(s) (e.g., RLC, MAC, PHY) and then sends the processed content packet data to the UE 400, which relates to operation 704 of FIG. 7.

Figure 11:
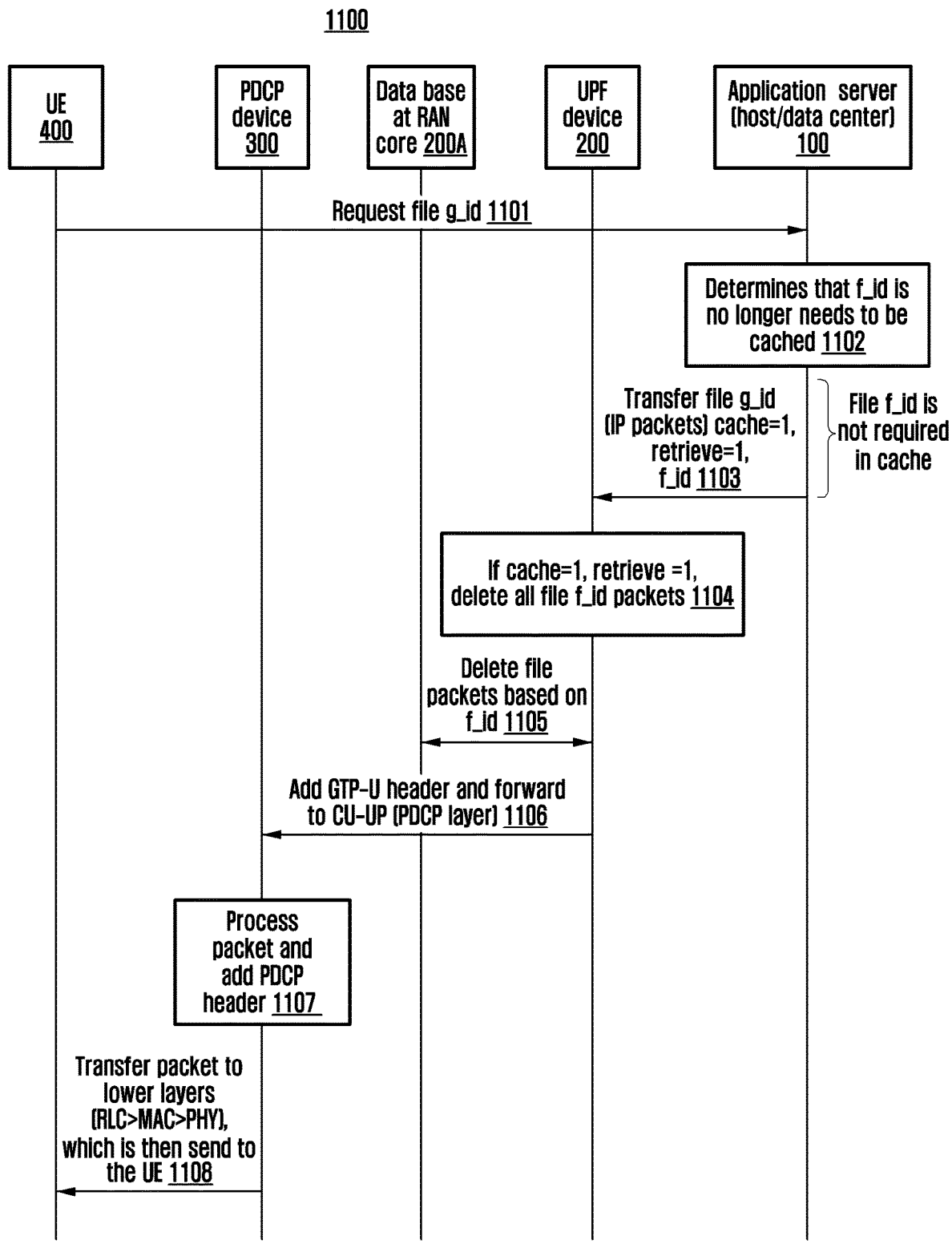
FIG. 11 is a flow diagram illustrating a method for deleting content file(s) from the RAN-core database in the 5G cellular network using the application server, according to an embodiment of the disclosure.

FIG. 11 is a flow diagram illustrating a method 1100 for deleting content file(s) from the RAN-core database 200A in the 5G cellular network using the application server 100, according to an embodiment of the disclosure.

Referring to FIG. 11, at operation 1101, the UE 400 sends the content request comprising the file identity (g_id) to the application server 100, which relates to operation 701 of FIG. 7.

At operation 1102, the application server 100 determines whether there is any file (f_id can be the same as well as different than g_id) that was cached at the RAN-core database 200A and needs to be deleted based on the one or more cache parameters and/or prior knowledge of the application server 100, which relates to operation 702 of FIG. 7. Example of one or more cache parameters includes, but are not limited to, the popularity of content associated with the file identity, the geography of the UE 400, and the profile of the content.

At operation 1103, after determining that the content may be deleted at the RAN-core database 200A, the application server 100 performs the basic operation of segmentation. The application server 100 then assigns the one or more assisting parameters (i.e., cache bit=1, retrieve bit=1, f_id) in the header of the IP (i.e., the option field of the IPv4 or the extension of the IPv6), which relates to operation 703 of FIG. 7 and sends the one or more assisting parameters and the content packet data to the UPF device 200.

At operations 1104 and 1105, the UPF device 200 determines whether the cache bit is enabled or disabled and whether the retrieve bit is enabled or disabled upon receiving the one or more assigned assisting parameters from the application server 100, which relates to operation 704 of FIG. 7. The UPF device 200 then deletes, in the RAN-core database 200A, the cached content packet data based on the file identity in response to determining that the cache bit is enabled, and the retrieve bit is enabled.

At operation 1106, the UPF device 200 performs the standard operation such as adding the GTP-U header and forwarding content packet data to the PDCP device (300), which relates to operation 704 of FIG. 7.

At operation 1107, the PDCP device 300 performs the standard operation such as processing the received content packet data from the UPF device (200) and adding the PDCP header in the received content packet data, which relates to operation 704 of FIG. 7.

At operation 1108, the PDCP device 300 transfers the processed content packet data to the lower layer(s) (e.g., RLC, MAC, PHY) and then sends the processed content packet data to the UE 400, which relates to operation 704 of FIG. 7.

Figure 12:
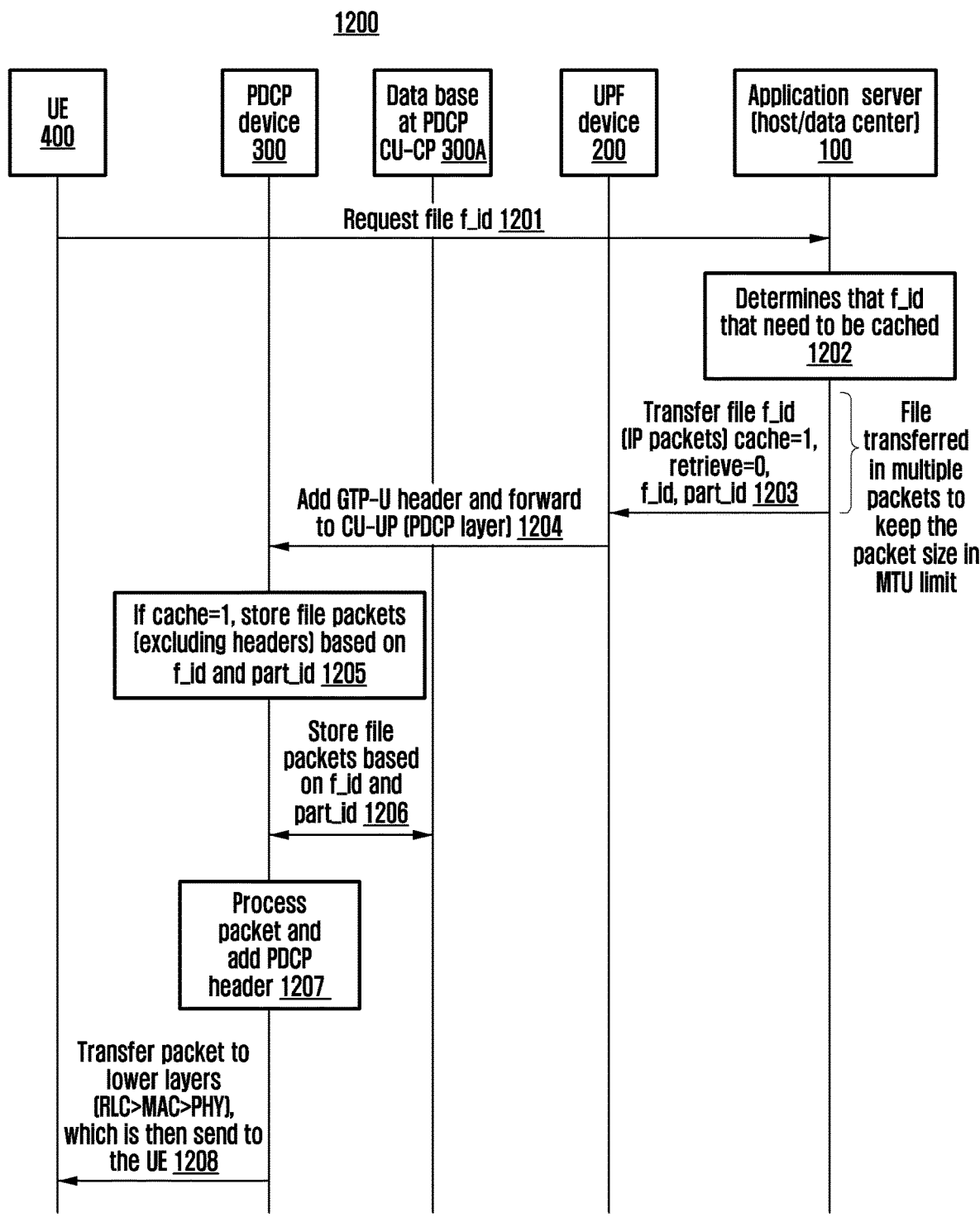
FIG. 12 is a flow diagram illustrating a method for caching content file(s) at a PDCP database in the 5G cellular network using an application server, according to an embodiment of the disclosure.

FIG. 12 is a flow diagram illustrating a method 1200 for caching content file(s) at the PDCP database 300A in the 5G cellular network using the application server 100, according to an embodiment of the disclosure.

At operation 1201, the UE 400 sends the content request comprising the file identity (f_id) (e.g., the identity associated with video content) to the application server 100, which relates to operation 701 of FIG. 7.

At operation 1202, upon receiving the content request, the application server 100 determines whether to cache/retrieve/delete the content associated with the file identity, from the PDCP database 300A based on the one or more cache parameters and/or prior knowledge of the application server 100, which relates to operation 702 of FIG. 7. Example of one or more cache parameters includes, but are not limited to, the popularity of content associated with the file identity, the geography of the UE 400, and the profile of the content.

At operation 1203, after determining that the content may be cached at the PDCP database 300A, the application server 100 performs the basic operation of segmentation, where the content file(s) is transferred in multiple packets (content packet data) to keep the packet size within an MTU limit The application server 100 then assigns the one or more assisting parameters (i.e., cache bit=1, retrieve bit=0, f_id, part_id) in the header of the IP (i.e., the option field of the IPv4 or the extension of the IPv6), which relates to operation 703 of FIG. 7, and sends the one or more assisting parameters and the content packet data to the UPF device 200.

At operation 1204, the UPF device 200 performs the standard operation such as adding the GTP-U header and forwarding content packet data to the PDCP device (300), which relates to operation 704 of FIG. 7.

At operations 1205 and 1206, the PDCP device 300 determines whether the cache bit is enabled or disabled and whether the retrieve bit is enabled or disabled upon receiving the one or more assigned assisting parameters from the application server 100, which relates to operation 704 of FIG. 7. The PDCP device 300 removes the header information (header of the IP). The PDCP device 300 then caches, in the PDCP database 300A, the received content packet data based on the file identity, and the part identity in response to determining that the cache bit is enabled, and the retrieve bit is disabled.

At operation 1207, the PDCP device 300 performs the standard operation such as processing the received content packet data from the UPF device 200 and adding the PDCP header in the received content packet data, which relates to operation 704 of FIG. 7.

At operation 1208, the PDCP device 300 transfers the processed content packet data to the lower layer(s) (e.g., RLC, MAC, PHY) and then sends the processed content packet data to the UE 400, which relates to operation 701 of FIG. 7.

Figure 13:
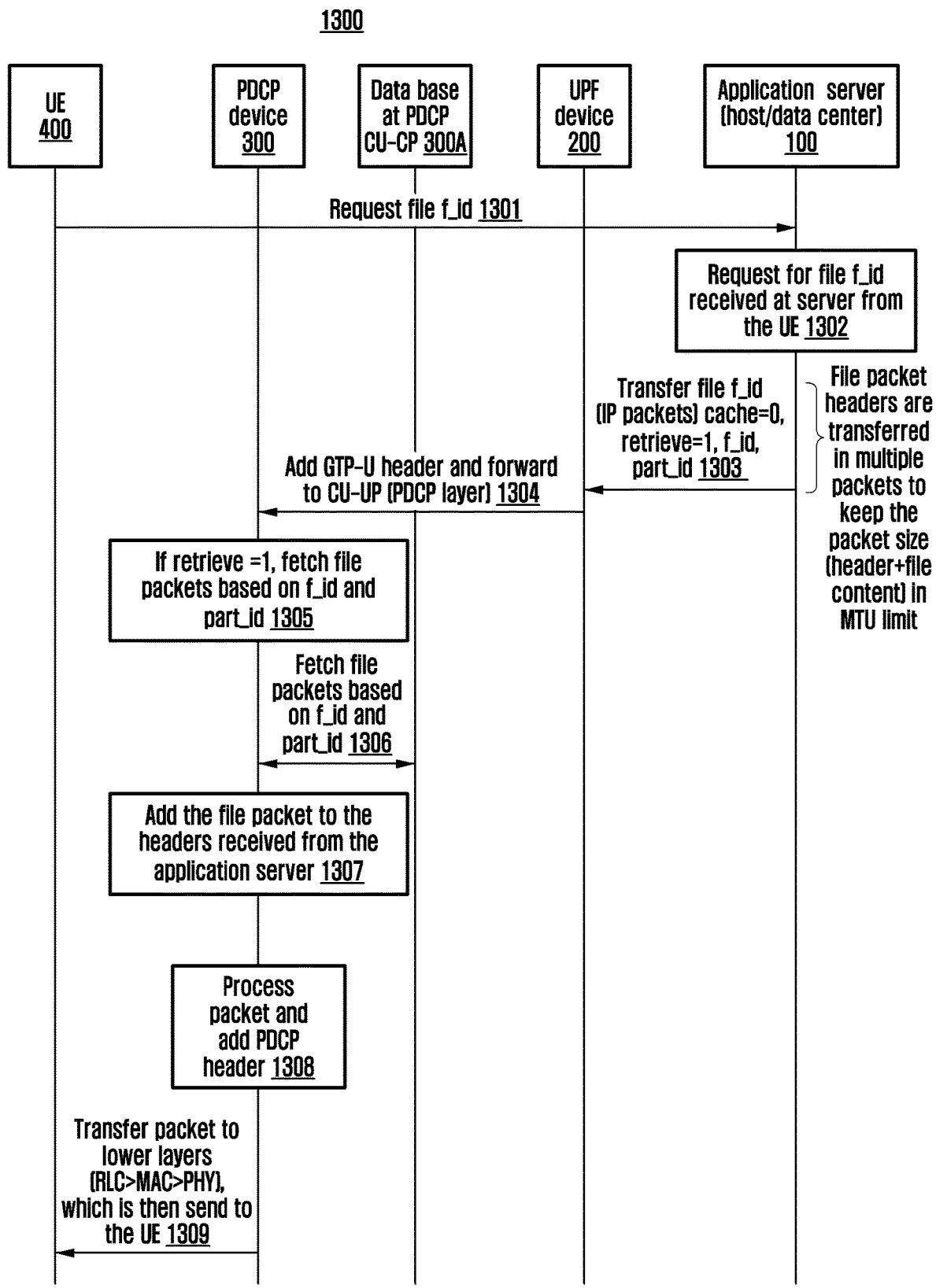
FIG. 13 is a flow diagram illustrating a method for retrieving/serving content file(s) from the PDCP database in the 5G cellular network using the application server, according to an embodiment of the disclosure.

FIG. 13 is a flow diagram illustrating a method 1300 for retrieving/serving content file(s) from the PDCP database 300A in the 5G cellular network using the application server 100, according to an embodiment of the disclosure.

At operation 1301, the UE 400 sends the content request comprising the file identity (f_id) (e.g., the identity associated with video content) to the application server 100, which relates to operation 701 of FIG. 7.

At operation 1302, upon receiving the content request, the application server 100 determines whether to cache/retrieve/delete the content associated with the file identity, from the PDCP database 300A based on the one or more cache parameters and/or prior knowledge of the application server (100), which relates to operation 702 of FIG. 7. Example of one or more cache parameters includes, but are not limited to, the popularity of content associated with the file identity, the geography of the UE 400, and the profile of the content.

At operation 1303, after determining that the content may be retrieved from the PDCP database 300A, the application server 100 performs the basic operation of segmentation, where the content file(s) is transferred in multiple packets (content packet data) to keep the packet size (header+ content packet data) within the MTU limit The application server 100 then assigns the one or more assisting parameters (i.e., cache bit=0, retrieve bit=1, f_id, part_id) in the header of the IP (i.e., the option field of the IPv4 or the extension of the IPv6), which relates to operation 703 of FIG. 7, and sends the header information and the one or more assisting parameters to the UPF device 200 (excluding content packet data).

At operation 1304, the UPF device 200 performs the standard operation such as adding the GTP-U header and forwarding content packet data to the PDCP device 300, which relates to operation 704 of FIG. 7.

At operations 1305 and 1306, the PDCP device 300 determines whether the cache bit is enabled or disabled and whether the retrieve bit is enabled or disabled upon receiving the one or more assigned assisting parameters from the application server 100, which relates to operation 704 of FIG. 7. The PDCP device 300 then retrieves, from the PDCP database 300A, the content packet data based on the file identity, and the part identity in response to determining that the cache bit is disabled, and the retrieve bit is enabled.

At operation 1307, the PDCP device 300 then adds all header information received from the application server 100 to the retrieved content packet data, which relates to operation 704 of FIG. 7.

At operation 1308, the PDCP device 300 performs the standard operation such as processing the received content packet data from the UPF device 200 and adding the PDCP header in the received content packet data, which relates to operation 704 of FIG. 7.

At operation 1309, the PDCP device 300 transfers the processed content packet data to the lower layer(s) (e.g., RLC, MAC, PHY) and then sends the processed content packet data to the UE (400), which relates to operation 704 of FIG. 7.

Figure 14:
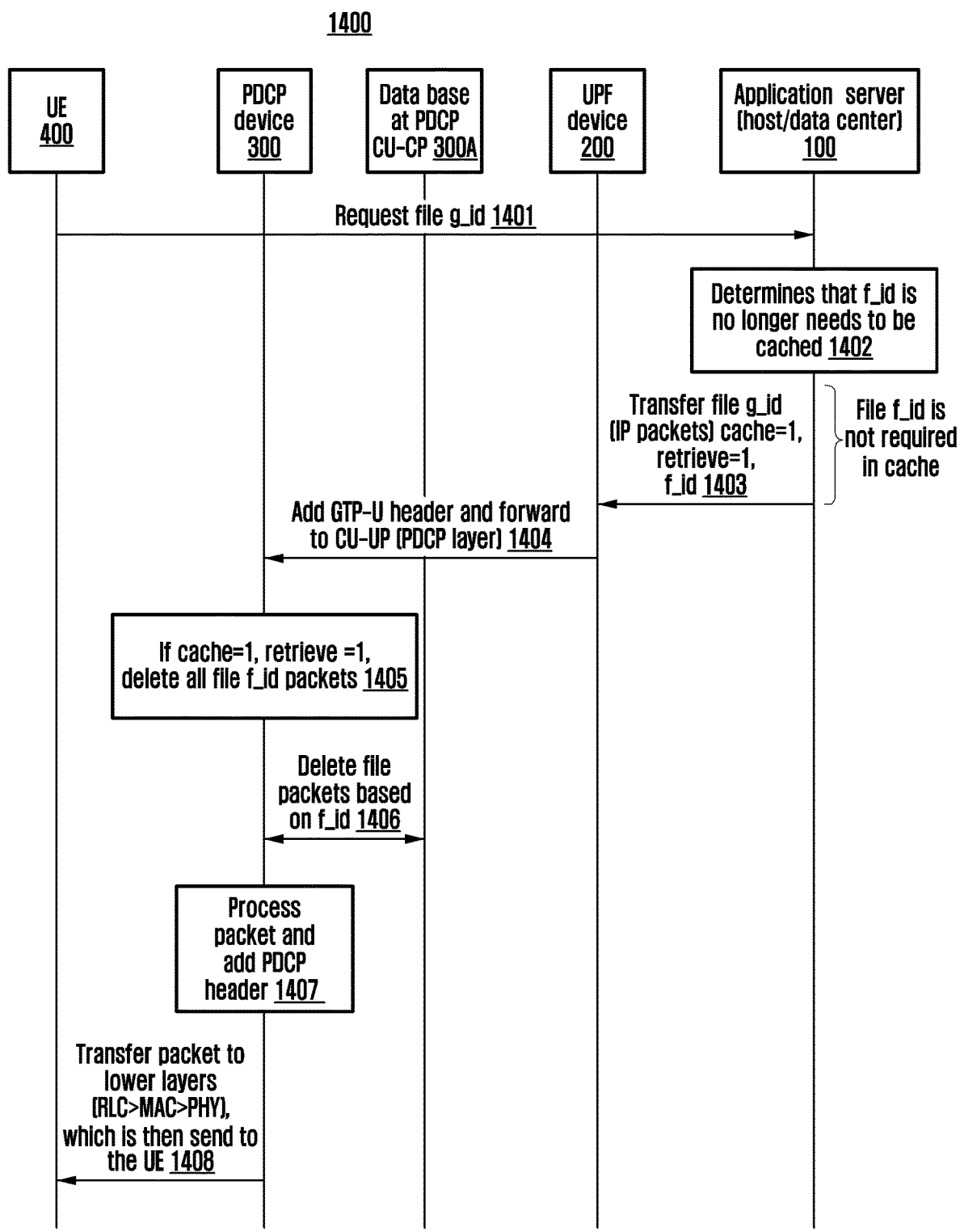
FIG. 14 is a flow diagram illustrating a method for deleting content file(s) from the PDCP database in the 5G cellular network using the application server, according to an embodiment of the disclosure.

FIG. 14 is a flow diagram illustrating a method 1400 for deleting content file(s) from the PDCP database in the 5G cellular network using the application server, according to an embodiment of the disclosure.

Referring to FIG. 14, at operation 1401, the UE 400 sends the content request comprising the file identity (g_id) to the application server 100, which relates to operation 701 of FIG. 7.

At operation 1402, the application server 100 determines whether there is any file (f_id can be the same as well as different than g_id) that was cached at the CU-CP database 300A and needs to be deleted based on the one or more cache parameters and/or prior knowledge of the application server 100, which relates to operation 702 of FIG. 7. Example of one or more cache parameters includes, but are not limited to, the popularity of content associated with the file identity, the geography of the UE 400, and the profile of the content.

At operation 1403, after determining that the content may be deleted at the CU-CP database 300A, the application server 100 performs the basic operation of segmentation. The application server 100 then assigns the one or more assisting parameters (i.e., cache bit=1, retrieve bit=1, f_id) in the header of the IP (i.e., the option field of the IPv4 or the extension of the IPv6), which relates to operation 703 of FIG. 7 and sends the one or more assisting parameters and the content packet data to the UPF device 200.

At operation 1404, the UPF device 200 performs the standard operation such as adding the GTP-U header and forwarding content packet data to the PDCP device 300, which relates to operation 704 of FIG. 7.

At operations 1405 and 1406, the PDCP device 300 determines whether the cache bit is enabled or disabled and whether the retrieve bit is enabled or disabled upon receiving the one or more assigned assisting parameters from the application server 100, which relates to operation 704 of FIG. 7. The PDCP device 300 then deletes, in the CU-CP database 300A, the cached content packet data based on the file identity in response to determining that the cache bit is enabled, and the retrieve bit is enabled.

At operation 1407, the PDCP device 300 performs the standard operation such as processing the received content packet data from the UPF device (200) and adding the PDCP header in the received content packet data, which relates to operation 704 of FIG. 7.

At operation 1408, the PDCP device 300 transfers the processed content packet data to the lower layer(s) (e.g., RLC, MAC, PHY) and then sends the processed content packet data to the UE 400, which relates to operation 704 of FIG. 7.

Figure 15:
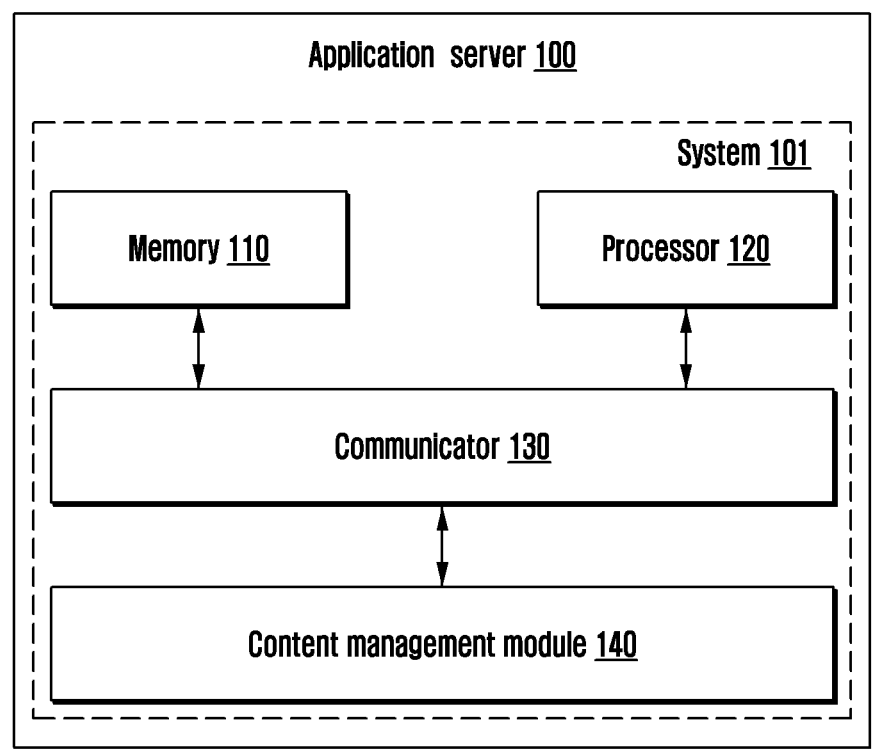
FIG. 15 illustrates a block diagram of the application server for the content management in the 5G cellular network, according to an embodiment of the disclosure.

FIG. 15 illustrates a block diagram of the application server 100 for the content management in the 5G cellular network, according to an embodiment of the disclosure.

Referring to FIG. 15, the application server 100 comprises a system 101. The system 101 may include a memory 110, a processor 120, a communicator 130, and a content management module 140.

The memory 110 stores instructions to be executed by the processor (120) for the content management in the 5G cellular network, as discussed throughout the disclosure. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. A non-transitory storage medium may store data that can, over time, change (e.g., in Random Access Memory (RAM) or cache). The memory 110 can be an internal storage unit, or it can be an external storage unit of the application server 100, a cloud storage, or any other type of external storage.

The processor 120 communicates with the memory 110, the communicator 130, and the content management module 140. The processor 120 is configured to execute instructions stored in the memory 110 and to perform various processes for the content management in the 5G cellular network, as discussed throughout the disclosure. The processor 120 may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130 is configured for communicating internally between internal hardware components and with external devices (e.g., UPF device 200, PDCP device 300, UE 400, etc.) via one or more networks (e.g., Radio technology). The communicator 130 includes an electronic circuit specific to a standard that enables wired or wireless communication.

The content management module 140 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In one or more embodiments, the content management module 140 receives the content request comprising the file identity from the UE 400. The content management module 140 performs, upon receiving the content request, by the application server 100, at least one action associated with the content caching, the content retrieval, and the content deletion. The at least one action upon receiving the content request includes the following operations.

The content management module 140 determines whether to cache the content associated with the file identity, to the RAN core database (200A) or the CU-UP database 300A based on the one or more cache parameters.

The content management module 140 determines that the content associated with the file identity has been cached at the RAN core database 200A or the CU-UP database 300A and whether to retrieve the content associated with the file identity, from the RAN core database 200A or the CU-UP database 300A.

The content management module 140 determines that the content associated with the file identity has been cached at the RAN core database 200A or the CU-UP database 300A and whether to delete the content associated with the file identity, from the RAN core database 200A or the CU-UP database 300A based on the one or more cache parameters.

The content management module 140 assigns the one or more assisting parameters in the header of the IP packet, based on the at least one performed action. The content management module 140 assists at least one of the UPF device 200, and the PDCP device 300 of the 5G cellular network to manage content, based on the one or more assigned assisting parameters.

The content management module 140 transmits the header information, and the content packet data to the UPF device 200 for the content caching based on the one or more cache parameters.

The content management module 140 transmits the header information only to the UPF device 200 for the content retrieval when the application server 100 determines that the content associated with the file identity has been cached at the RAN core database 200A.

The content management module 140 transmits the header information, and the content packet data to the PDCP device 300 via the UPF device 200 for the content caching based on the one or more cache parameters.

The content management module 140 transmits the header information to the PDCP device 300 via the UPF device 200 for the content retrieval when the application server 100 determines that the content associated with the file identity has been cached at the CU-UP database 300A.

The content management module 140 creates the RAN core database 200A at the UPF device 200 or the CU-UP database 300A at the PDCP device 300 for the at least one action.

The content management module 140 receives the content request from the UE 400 for the content. The content management module 140 then determines the availability of the requested content in the RAN core database 200A or the CU-UP database 300A. The content management module 140 then causes to cache the requested content in the 5G cellular network, when the requested content is not available at the RAN core database 200A or the CU-UP database 300A, wherein the 5G cellular network sends the requested content to the UE 400 after the content is cached in the 5G cellular network. The content management module 140 causes to predict the possibility of the recurrence of the content request for the content by at least one or more UEs. The content management module 140 sends, based on the prediction, the content request to the 5G cellular network wherein the content request comprises one or more assisting parameters.

Although FIG. 15 shows various hardware components of the application server 100, but it is to be understood that other embodiments are not limited thereon. In other embodiments, the application server 100 may include a different number of components. Further, the labels or names of the components are used only for illustrative purposes and do not limit the scope of the disclosure. One or more components can be combined to perform the same or substantially similar functions for the content management in the 5G cellular network.

Figure 16:
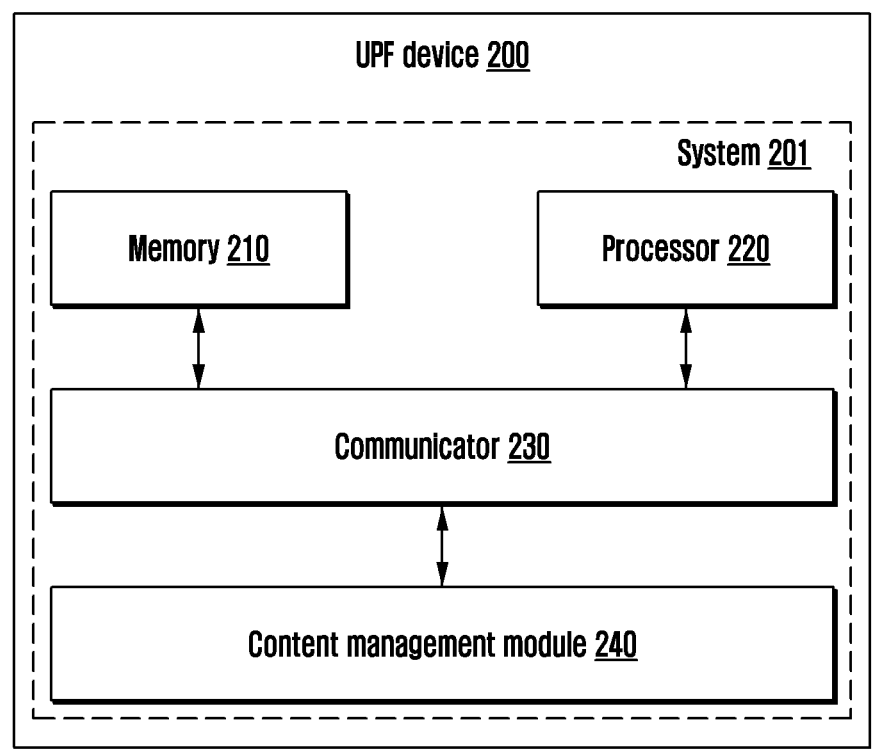
FIG. 16 illustrates a block diagram of a User Plane Function (UPF) device for the content management in the 5G cellular network, according to an embodiment of the disclosure.

FIG. 16 illustrates a block diagram of the UPF device 200 for the content management in the 5G edge cellular network, according to an embodiment of the disclosure.

Referring to FIG. 16, the UPF device 200 comprises a system 201. The system 201 may include a memory 210, a processor 220, a communicator 230, and a content management module 240.

The memory 210 stores instructions to be executed by the processor 220 for the content management in the 5G cellular network, as discussed throughout the disclosure. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. A non-transitory storage medium may store data that can, over time, change (e.g., in Random Access Memory (RAM) or cache). The memory 210 can be an internal storage unit, or it can be an external storage unit of the UPF device 200, a cloud storage, or any other type of external storage.

The processor 220 communicates with the memory 210, the communicator 230, and the content management module 240. The processor 220 is configured to execute instructions stored in the memory 210 and to perform various processes for the content management in the 5G cellular network, as discussed throughout the disclosure. The processor 220 may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 230 is configured for communicating internally between internal hardware components and with external devices (e.g., application server 100, PDCP device 300, UE 400, etc.) via one or more networks (e.g., Radio technology). The communicator 230 includes an electronic circuit specific to a standard that enables wired or wireless communication.

The content management module 240 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The content management module 240 receives at least one of the header information associated with the IP packet and the content packet data associated with the content from the application server 100, with the one or more assigned assisting parameters. The content management module 240 then determines whether the cache bit is enabled or disabled and whether the retrieve bit is enabled or disabled upon receiving the one or more assigned assisting parameters from the application server 100. The content management module 240 then performs the following operations.

The content management module 240 caches, to the RAN core database 200A, the received content packet data based on the file identity, and the part identity in response to determining that the cache bit is enabled, and the retrieve bit is disabled.

The content management module 240 retrieves, from the RAN core database 200A, the cached content packet data based on the file identity, and the part identity in response to determining that the cache bit is disabled, and the retrieve bit is enabled, and adding the header information in the stored content packet data.

The content management module 240 deletes, from the RAN core database 200A, the cached content packet data based on the file identity, and the part identity in response to determining that the cache bit is enabled, and the retrieve bit is enabled.

The content management module 240 stores the content packet data in the RAN core database 200A, for the content caching based on the one or more cache parameters.

The content management module 240 adds the content to header information associated with the IP packet from the RAN core database 200A, for the content retrieval.

Although FIG. 16 shows various hardware components of the UPF device 200, but it is to be understood that other embodiments are not limited thereon. In other embodiments, the UPF device 200 may include a different number of components.

Further, the labels or names of the components are used only for illustrative purposes and do not limit the scope of the disclosure. One or more components can be combined to perform the same or substantially similar functions for the content management in the 5G cellular network.

Figure 17:
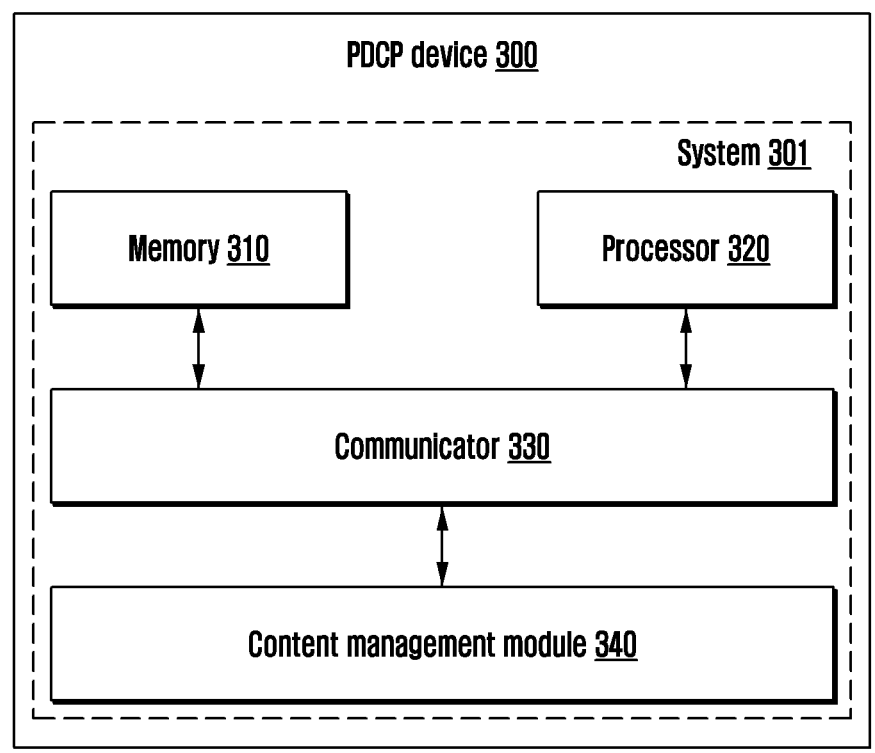
FIG. 17 illustrates a block diagram of a Packet Data Convergence Protocol (PDCP) device for the content management in the 5G cellular network, according to an embodiment of the disclosure.

FIG. 17 illustrates a block diagram of the PDCP device 300 for the content management in the 5G cellular network, according to an embodiment of the disclosure.

Referring to FIG. 17, the PDCP device 300 comprises a system 301. The system 301 may include a memory 310, a processor 320, a communicator 330, and a content management module 340.

The memory 310 stores instructions to be executed by the processor 320 for the content management in the 5G cellular network, as discussed throughout the disclosure. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. A non-transitory storage medium may store data that can, over time, change (e.g., in Random Access Memory (RAM) or cache). The memory 310 can be an internal storage unit, or it can be an external storage unit of the PDCP device 300, a cloud storage, or any other type of external storage.

The processor 320 communicates with the memory 310, the communicator 330, and the content management module 340. The processor 320 is configured to execute instructions stored in the memory 310 and to perform various processes for the content management in the 5G cellular network, as discussed throughout the disclosure. The processor 320 may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 330 is configured for communicating internally between internal hardware components and with external devices (e.g., application server 100, UPF device 200, UE 400, etc.) via one or more networks (e.g., Radio technology). The communicator 330 includes an electronic circuit specific to a standard that enables wired or wireless communication.

The content management module 340 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The content management module 340 receives at least one of the header information associated with the IP packet and the content packet data associated with the content from the application server 100 via the UPF device 200, with the one or more assigned assisting parameters. The content management module 340 then determines whether the cache bit is enabled or disabled and whether the retrieve bit is enabled or disabled upon receiving the one or more assigned assisting parameters from the application server 100. The content management module 340 then performs the following operations.

The content management module 340 caches, in the CU-UP database 300A, the received content packet data based on the file identity, and the part identity in response to determining that the cache bit is enabled, and the retrieve bit is disabled.

The content management module 340 retrieves, from the CU-UP database 300A, the cached content packet data based on the file identity, and the part identity in response to determining that the cache bit is disabled, and the retrieve bit is enabled, and adding the header information in the stored content packet data.

The content management module 340 deletes, from the CU-UP database 300A, the cached content packet data based on the file identity, and the part identity in response to determining that the cache bit is enabled, and the retrieve bit is enabled.

The content management module 340 stores the content packet data only in the CU-UP database (300A), for the content caching based on the one or more cache parameters.

The content management module 340 adds the content to the header of the IPv4 packet or the IPv6 packet from the RAN core database 200A, for the content retrieval.

Although FIG. 17 shows various hardware components of the PDCP device 300, but it is to be understood that other embodiments are not limited thereon. In other embodiments, the PDCP device 300 may include a different number of components. Further, the labels or names of the components are used only for illustrative purposes and do not limit the scope of the disclosure. One or more components can be combined to perform the same or substantially similar functions for the content management in the 5G cellular network.

The method 700 according to embodiments of the disclosure has several advantages, some of which are listed below.

The application server 100 handles content requests. The application server 100 retains complete control to fulfill the request from the RAN/Core cache or local database. As a result, processing all content requests at the RAN will not add any overhead.

The disclosed method 700 does not necessitate intercepting content requests at the RAN or any hardware that does so. As a result, the disclosed method 700 requires no additional overhead.

The disclosed method 700 allows the application server 100 complete control over cached data and caches data even if the data is segmented into multiple packets and encrypted/ciphered for security and privacy. The disclosed method 700 aids in reducing latency when delivering content from the application server 100 to the end user(s). The application server 100 can decide what content should be cached in the 5G RAN/Core so that the data/packet(s)/content can be delivered with less latency and thus provide a better user experience.

The disclosed method 700 caches the packet(s) at the network element (e.g., RAN/core) without performing deep packet inspection. As a result, the operator's operational expenses are reduced. Otherwise, the operator may invest in infrastructure to set up deep packet inspection (DPI) infrastructure. Additional packet inspection per flow is a significant overhead. Because of the simplified implementation using the cache and retrieve bit, the disclosed method 700 may be easy to upgrade or adapt to an existing commercial system.

The disclosed method 700 caches the content at the 5G Edge and hence the content can be delivered with lower latency, which will enhance user experiences by delivering the contents in near real-time with approximate latency of ~5-20 ms. The application server 100 has full control over what data need to be cached and for what duration of time. Cellular operators need not check the packet content (except header information); hence privacy and security of data are insured. Content that is encrypted at a source (application server 100) can also be stored in the 5G Edge. The contents that are transmitted in multiple packets can also be stored in the 5G Edge.

The disclosed method 700 caches the content in the RAN so that the contents can be delivered with a lower RTT latency.

The disclosed method 700 caches the content even if the content is segmented at a Transport layer (TCP) or application layer by the application server 100 or software mechanism.

The various actions, acts, blocks, steps, or the like in the flow diagrams/sequence diagrams may be performed in the order presented, in a different order, or simultaneously. Further, in some embodiments, some of the actions, acts, blocks, steps, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for content management in a cellular network, the method comprising:
receiving, by an application server, a content request comprising a file identity from a User Equipment (UE);
performing, upon receiving the content request, by the application server, at least one action associated with content caching, content retrieval, and content deletion;
assigning, by the application server, one or more assisting parameters in a header of an Internet Protocol (IP) packet, based on the at least one performed action; and
assisting, by the application server, at least one of a User Plane Function (UPF) device, and a Packet Data Convergence Protocol (PDCP) device of the cellular network to manage content, based on the one or more assigned assisting parameters.

2. The method of claim 1, wherein performing, by the application server, the at least one action upon receiving the content request comprises:
determining, by the application server, whether to cache the content associated with the file identity, to a Radio Access Network (RAN) core database or Centralized Unit (CU)-User Plane (UP) database based on one or more cache parameters;
determining, by the application server, that the content associated with the file identity has been cached at the RAN core database or CU-UP database 300A and whether to retrieve the content associated with the file identity, from the RAN core database or CU-UP database; and
determining, by the application server, that the content associated with the file identity has been cached at the RAN core database or CU-UP database and whether to delete the content associated with the file identity, from the RAN core database or CU-UP database based on the one or more cache parameters.

3. The method of claim 2, wherein the one or more cache parameters comprise at least one of a popularity of the content associated with the file identity, a geography of the UE, and a profile of the content.

4. The method of claim 1, wherein the one or more assisting parameters comprise at least one of a cache bit, a retrieve bit, the file identity, and a part identity of the file identity.

5. The method of claim 1, wherein assisting the UPF device, based on the one or more assigned assisting parameters, for content management in the cellular network further comprises:
receiving, by the UPF device, at least one of a header information associated with an Internet Protocol (IP) packet and content packet data associated with the content from the application server, with one or more assigned assisting parameters;
determining, by the UPF device, whether a cache bit is enabled or disabled and whether a retrieve bit is enabled or disabled upon receiving the one or more assigned assisting parameters from the application server;
performing, by the UPF device, one of:
caching, to a Radio Access Network (RAN) core database, the received content packet data based on the file identity, and a part identity in response to determining that the cache bit is enabled, and the retrieve bit is disabled,
retrieving, from the RAN core database, the cached content packet data based on the file identity, and the part identity in response to determining that the cache bit is disabled, and the retrieve bit is enabled, and adding the header information in the cached content packet data, or
deleting, from the RAN core database, the cached content packet data based on the file identity, and the part identity in response to determining that the cache bit is enabled, and the retrieve bit is enabled; and
sending, by the UPF device, the content to the PDCP device.

6. The method of claim 5, further comprising:
transmitting, by the application server, the header information, and the content packet data to the UPF device for content caching based on one or more cache parameters; and
transmitting, by the application server, the header information only to the UPF device for content retrieval when the application server determines that the content associated with the file identity has been cached at the RAN core database.

7. The method of claim 5, wherein the method further comprises:
storing, by the UPF device, the content packet data in the RAN core database, for content caching based on one or more cache parameters; and
adding, by the UPF device, the content to header information associated with the IP packet from the RAN core database, for content retrieval.

8. The method of claim 5, wherein assisting the PDCP device, based on the one or more assigned assisting parameters, for content management in the cellular network further comprises:
receiving, by the PDCP device, at least one of a header information associated with the IP packet and a content packet data associated with the content from the application server via the UPF device, with one or more assigned assisting parameters;
determining, by the PDCP device, whether a cache bit is enabled or disabled and whether a retrieve bit is enabled or disabled upon receiving the one or more assigned assisting parameters from the application server;
performing, by the PDCP device, one of:
caching, in a Centralized Unit (CU)-User Plane (UP) database, the received content packet data based on the file identity, and a part identity in response to determining that the cache bit is enabled, and the retrieve bit is disabled,
retrieving, from the CU-UP database, the cached content packet data based on the file identity, and the part identity in response to determining that the cache bit is disabled, and the retrieve bit is enabled, and adding the header information in the cached content packet data, or
deleting, from the CU-UP database, the cached content packet data based on the file identity, and the part identity in response to determining that the cache bit is enabled, and the retrieve bit is enabled; and
sending, by the PDCP device, the content associated with the content request to the UE.

9. The method of claim 8, further comprising:
transmitting, by the application server, the header information, and the content packet data to the PDCP device via the UPF device for the content caching based on one or more cache parameters; and
transmitting, by the application server, the header information to the PDCP device via the UPF device for the content retrieval when the application server determines that the content associated with the file identity has been cached at the CU-UP database.

10. The method of claim 8, further comprising:
storing, by the PDCP device, the content packet data only in the CU-UP database, for the content caching based on one or more cache parameters; and
adding, by the PDCP device, the content to a header of an IPv4 packet or an IPv6 packet from, for the content retrieval.

11. The method of claim 1, wherein the header of the IP comprises one of an option field of an IP Version Four (IPv4) and an extension of an IP Version Six (IPv6).

12. The method of claim 1, further comprising:
creating, by the application server, a Radio Access Network (RAN) core database at the UPF device or a Centralized Unit (CU)-User Plane (UP) database at the PDCP device for the at least one action.

13. The method of claim 1,
wherein the method further comprises:
receiving, by the application server, the content request from the UE for the content,
determining, by the application server, availability of the requested content in a Radio Access Network (RAN) core database or Centralized Unit (CU)-User Plane (UP) database, and
causing, by the application server, to cache the requested content in the cellular network, when the requested content is not available at the RAN core database or the CU-UP database, and
wherein the cellular network sends the requested content to the UE after the content is cached in the cellular network.

14. The method of claim 13, further comprising:
causing, by the application server, to predict a possibility of recurrence of the content request for the content by at least one or more UEs; and
sending, by the application server, based on a prediction, the content request to the cellular network wherein the content request comprises one or more assisting parameters.

15. An application server for content management in a cellular network, the application server comprising:
a memory;
a processor; and
a content management module, operably connected to the memory and the processor, configured to:
receive a content request comprising a file identity from a User Equipment (UE),
perform, upon receiving the content request, at least one action associated with content caching, content retrieval, and content deletion,
assign one or more assisting parameters in a header of an Internet Protocol (IP) packet, based on the at least one performed action, and
assist at least one of a User Plane Function (UPF) device, and a Packet Data Convergence Protocol (PDCP) device of the cellular network to manage content, based on the one or more assigned assisting parameters.

16. The application sever of claim 15, wherein the content management module is configured to:
determine whether to cache the content associated with the file identity, to a Radio Access Network (RAN) core database or Centralized Unit (CU)-User Plane (UP) database based on one or more cache parameters;
determine that the content associated with the file identity has been cached at the RAN core database or CU-UP database 300A and whether to retrieve the content associated with the file identity, from the RAN core database or CU-UP database; and
determine that the content associated with the file identity has been cached at the RAN core database or CU-UP database and whether to delete the content associated with the file identity, from the RAN core database or CU-UP database based on the one or more cache parameters.

17. The application sever of claim 15, wherein the one or more assisting parameters comprise at least one of a cache bit, a retrieve bit, the file identity, and a part identity of the file identity.

18. The application sever of claim 17, wherein the one or more cache parameters comprise at least one of a popularity of the content associated with the file identity, a geography of the UE, and a profile of the content.

19. The application sever of claim 15,
wherein the content management module is configured to:
receive the content request from the UE for the content,
determine availability of the requested content in a Radio Access Network (RAN) core database or Centralized Unit (CU)-User Plane (UP) database, and
cause to cache the requested content in the cellular network, when the requested content is not available at the RAN core database or the CU-UP database, and
wherein the cellular network sends the requested content to the UE after the content is cached in the cellular network.

20. A User Plane Function (UPF) device for content management in a cellular network, the UPF device comprising:
a memory;
a processor; and
a content management module, operably connected to the memory and the processor, configured to:
receive at least one of a header information associated with an Internet Protocol (IP) packet and a content packet data associated with the content from an application server, with one or more assigned assisting parameters,
determine whether a cache bit is enabled or disabled and whether a retrieve bit is enabled or disabled upon receiving the one or more assigned assisting parameters from the application server,
perform one of:
caching, to a Radio Access Network (RAN) core database, the received content packet data based on a file identity, and a part identity in response to determining that the cache bit is enabled, and the retrieve bit is disabled,
retrieving, from the RAN core database, the cached content packet data based on the file identity, and the part identity in response to determining that the cache bit is disabled, and the retrieve bit is enabled, and adding the header information in the cached content packet data, or
deleting, from the RAN core database, the cached content packet data based on the file identity, and the part identity in response to determining that the cache bit is enabled, and the retrieve bit is enabled, and
send the content to a packet data convergence protocol (PDCP) device when the content associated with the file identity is available at the cellular network.

* * * * *